(12) United States Patent
Yamamoto

(10) Patent No.: US 10,585,438 B2
(45) Date of Patent: Mar. 10, 2020

(54) AUTOMATIC TRAVEL VEHICLE, METHOD OF CONTROLLING TRAVEL OPERATION OF AUTOMATIC TRAVEL VEHICLE, AND SERVER

(71) Applicant: Shohji Yamamoto, Kanagawa (JP)

(72) Inventor: Shohji Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/371,259

(22) Filed: Dec. 7, 2016

(65) Prior Publication Data
US 2017/0168496 A1    Jun. 15, 2017

(30) Foreign Application Priority Data

Dec. 15, 2015   (JP) .................................. 2015-244337

(51) Int. Cl.
*G05D 1/02*    (2006.01)
*G05D 1/00*    (2006.01)

(52) U.S. Cl.
CPC ......... *G05D 1/0234* (2013.01); *G05D 1/0022* (2013.01); *G05D 1/0212* (2013.01); *G05D 1/0246* (2013.01); *G05D 1/0276* (2013.01); *G05D 2201/0216* (2013.01)

(58) Field of Classification Search
None
See application file for complete search history.

(56) References Cited

U.S. PATENT DOCUMENTS

2009/0080704 A1* 3/2009 Mori .................. G06K 9/00798
382/104
2013/0338854 A1   12/2013 Yamamoto

FOREIGN PATENT DOCUMENTS

| CN | 102346483 A | 2/2012 |
| CN | 104089623 A | 10/2014 |
| CN | 104483966 A | 4/2015 |
| CN | 104915705 A | 9/2015 |
| JP | H04217011 A | 8/1992 |

(Continued)

OTHER PUBLICATIONS

Office Action for Chinese Patent Application No. 201611151582.9 dated Sep. 4, 2019.

(Continued)

*Primary Examiner* — John Olszewski
*Assistant Examiner* — Gerrad A Foster
(74) *Attorney, Agent, or Firm* — Harness, Dickey & Pierce, P.L.C.

(57) ABSTRACT

An automatic travel vehicle includes a body, a drive unit to move the body on a travel surface along a travel guide line, a detection unit to detect a mark attached to one adjacent portion of the travel guide line for one spot set along the travel guide line, and a control unit to control an operation of the automatic travel vehicle based on the detected mark. The control unit interprets the mark attached to the one adjacent portion of the travel guide line at a first side of the body when the automatic travel vehicle travels along the travel guide line in a first travelling direction, and interprets the mark attached to the one adjacent portion of the travel guide line at a second side of the body when the automatic travel vehicle travels along the travel guide line in a second travelling direction.

10 Claims, 18 Drawing Sheets

(56) References Cited

FOREIGN PATENT DOCUMENTS

| | | | |
|---|---|---|---|
| JP | 2009-251922 | | 10/2009 |
| JP | 2009251922 A | * | 10/2009 |
| JP | 2014-002603 | | 1/2014 |
| JP | 2015-095158 | | 5/2015 |
| JP | 2015-210656 | | 11/2015 |
| JP | 2015-210761 | | 11/2015 |

OTHER PUBLICATIONS

Office Action for Japanese Patent Application No. 2015-244337 dated Sep. 27, 2019.

* cited by examiner

MEDIAN OF CONTOUR: (35, 25)
ANGLE: 45 DEGREES

FIG. 7A

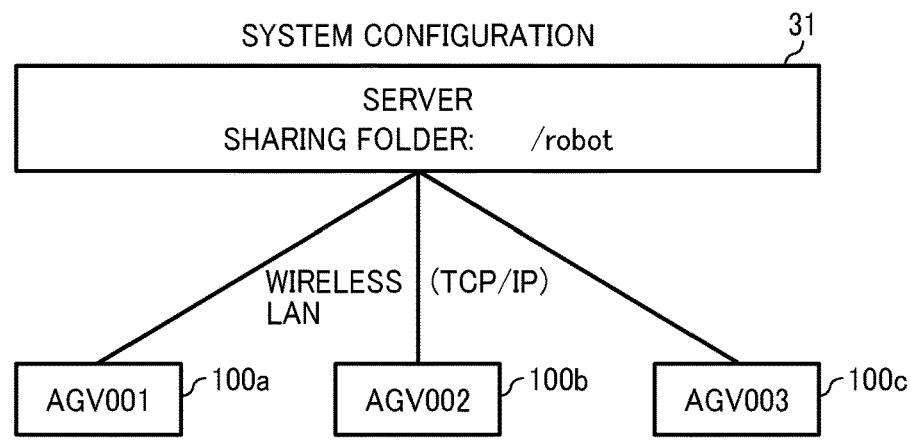

SYSTEM CONFIGURATION

FIG. 7B

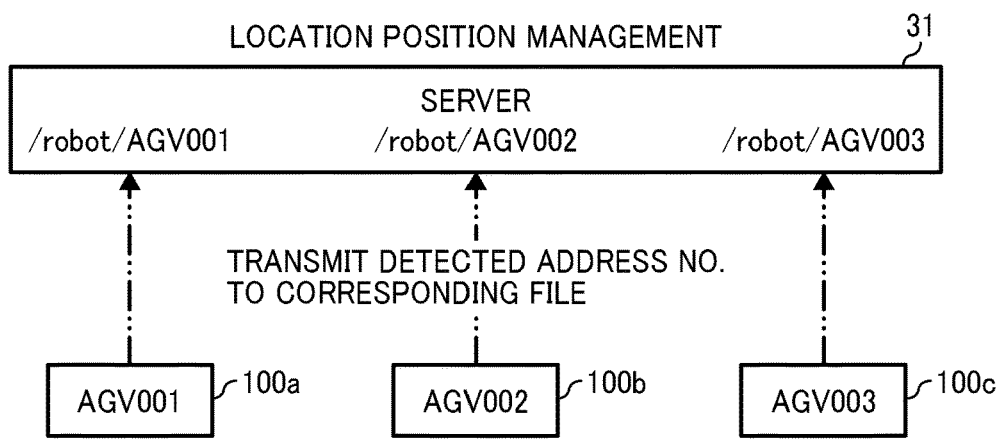

LOCATION POSITION MANAGEMENT

FIG. 7C

JUNCTION MANAGEMENT
JUNCTION NUMBER OF 80

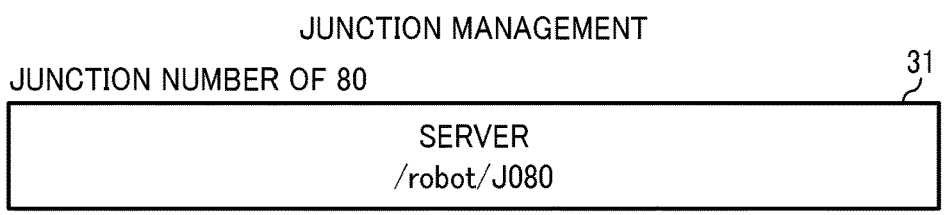

- WHEN VEHICLE REACHES JUNCTION IN:
  GENERATE "/robot/J080" FILE IF "/robot/J080" FILE DOES NOT EXIST
  LOCK "/robot/J080" FILE
  WHEN LOCKING IS SUCCESS, ENTER JUNCTION
  WHEN LOCKING IS NOT SUCCESS, WAIT UNTIL LOCKING BECOMES SUCCESS

- WHEN VEHICLE REACHES JUNCTION OUT
  UNLOCK "/robot/J080" FILE

FIG. 8A
DOWNLOAD OF AGV CONTROL PROGRAM,
TRAVEL OPERATION SCHEDULE TABLE,
AP SWITCHING TABLE
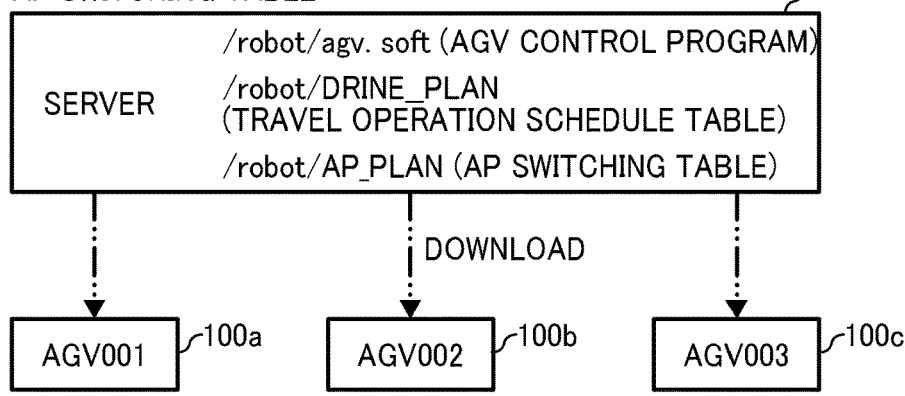
FIG. 8B
INPUT SCREEN OF AGV
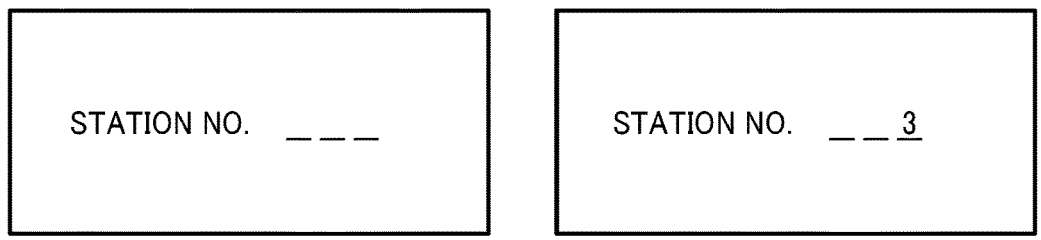
FIG. 8C
AP SWITCHING TABLE
| ADDRESS NO. | MAC ADDRESS OF AP |
|---|---|
| 30 | 00:12:3E:6C:D8:98 |
| 14 | 00:12:3E:6C:D8:98 |
| 20 | 00:12:3E:6C:D8:98 |
| 15 | 00:12:3E:6C:D8:98 |
| 16 | 00:12:3E:6C:D8:ED |
| 10 | 00:12:3E:6C:D8:ED |
| 11 | 00:12:3E:6C:D8:ED |
| 12 | 00:12:3E:6C:D8:ED |

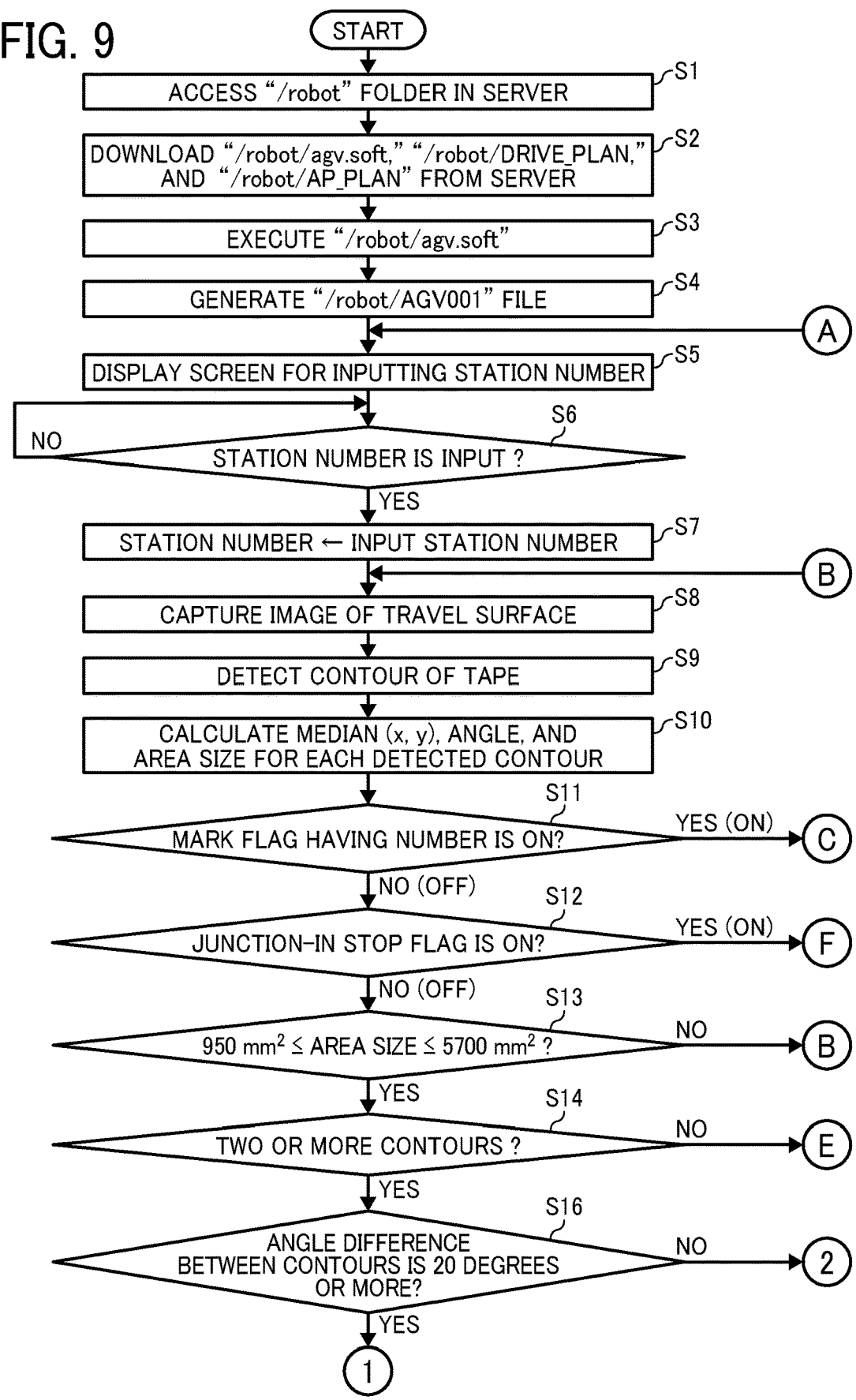

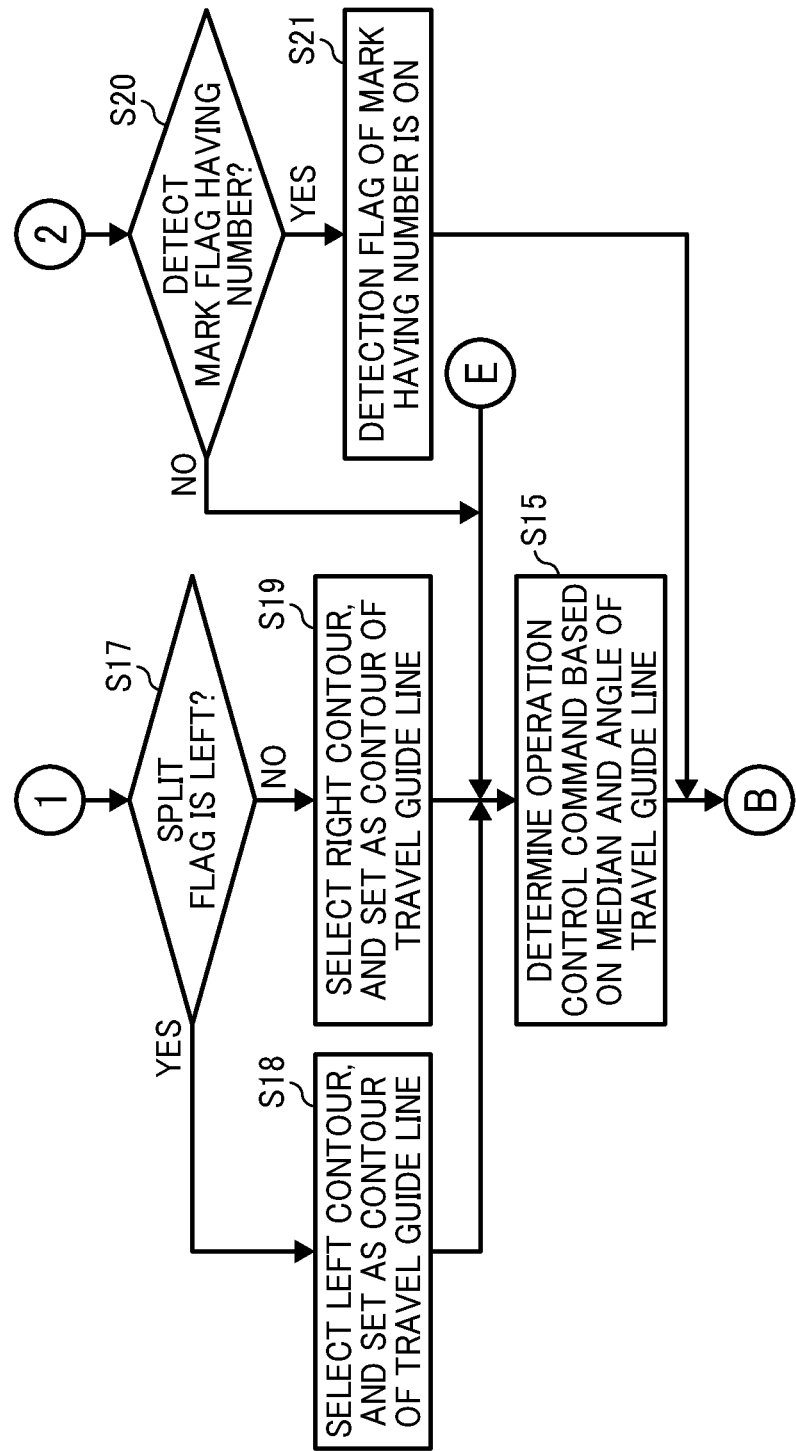

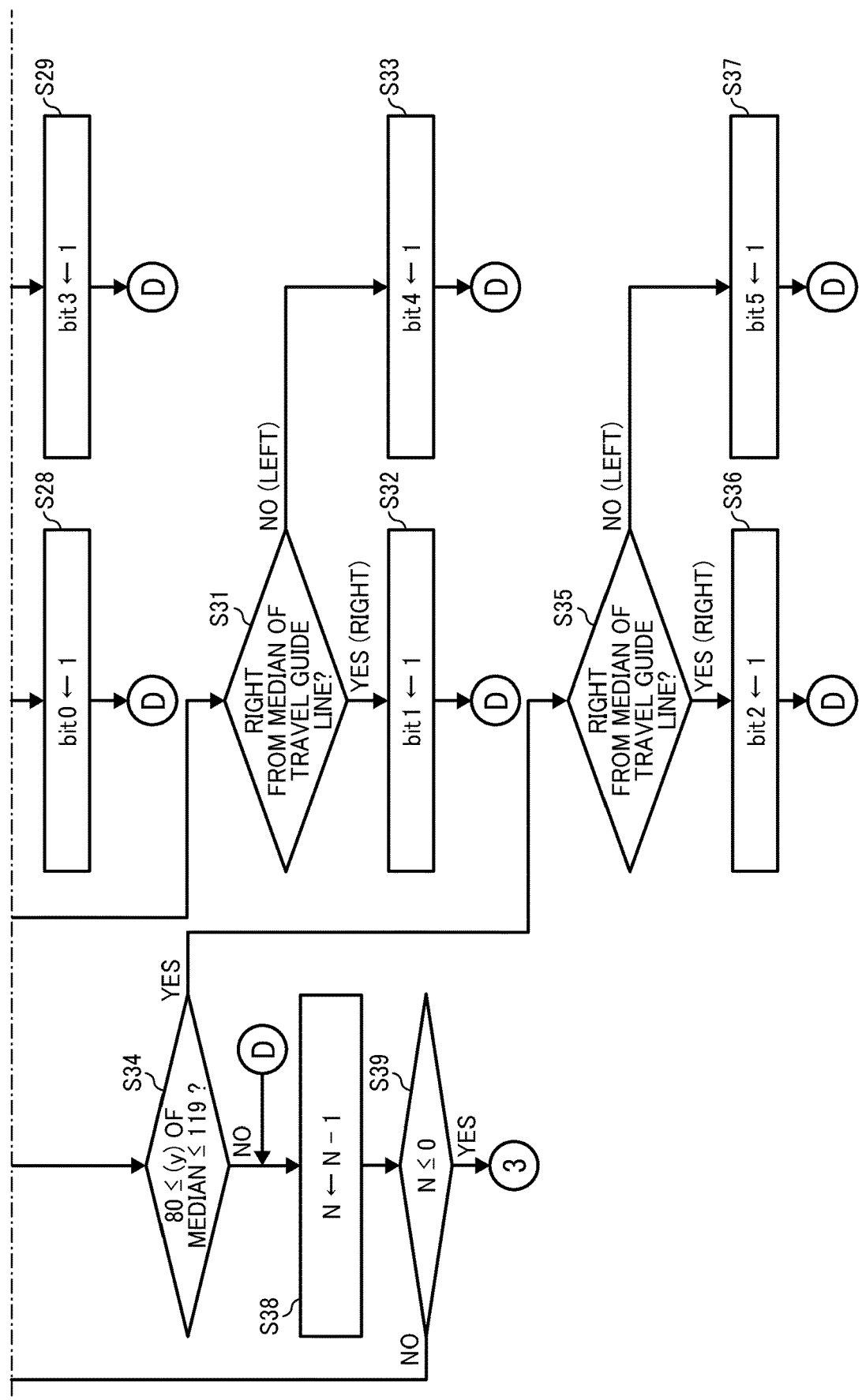

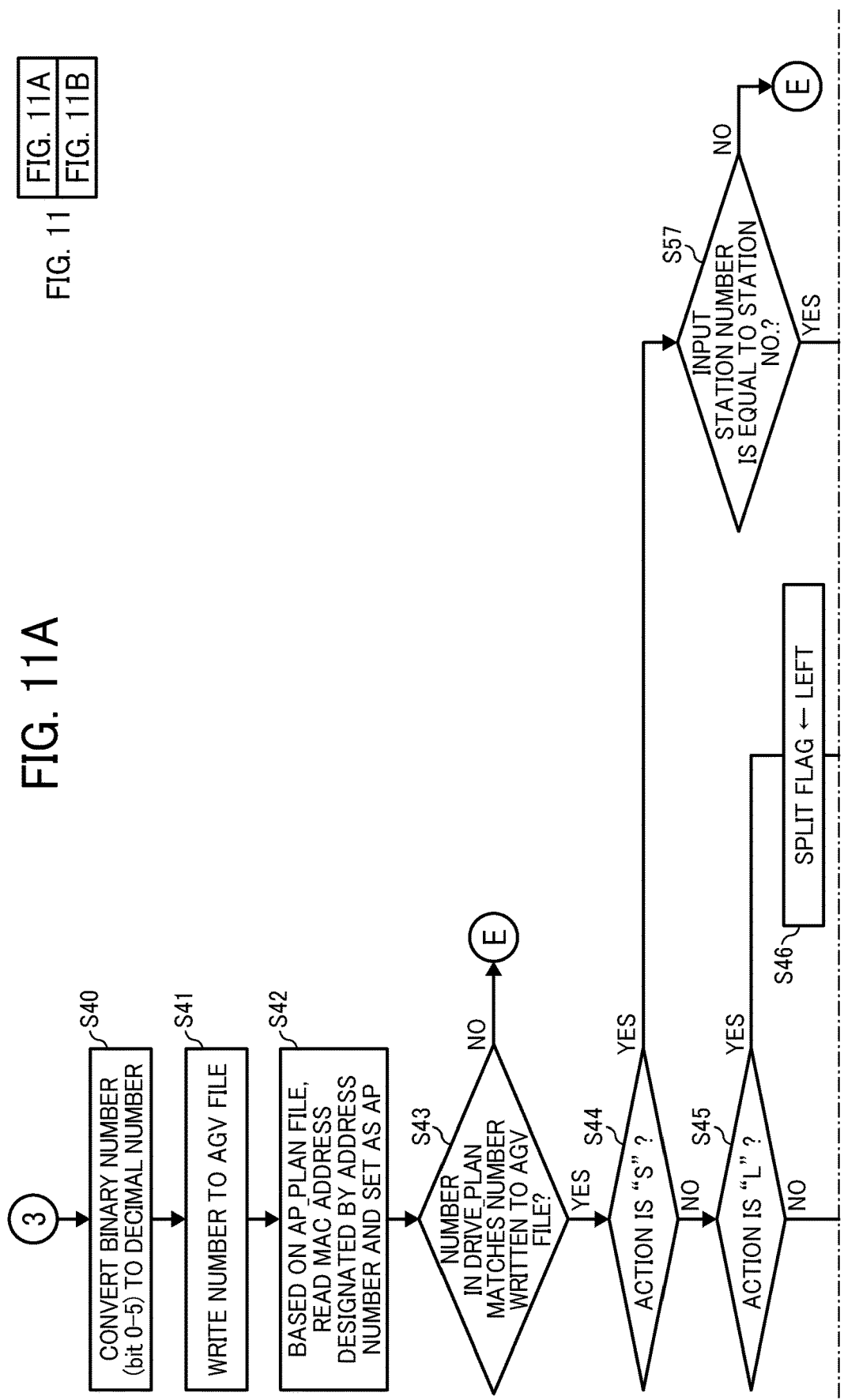

AUTOMATIC TRAVEL VEHICLE, METHOD OF CONTROLLING TRAVEL OPERATION OF AUTOMATIC TRAVEL VEHICLE, AND SERVER

CROSS-REFERENCE TO RELATED APPLICATION

This application claims priority pursuant to 35 U.S.C. § 119(a) to Japanese Patent Application No. 2015-244337, filed on Dec. 15, 2015 in the Japan Patent Office, the disclosure of which is incorporated by reference herein in its entirety.

BACKGROUND

Technical Field

This disclosure relates to an automatic travel vehicle, a method of controlling a travel operation of the automatic travel vehicle, and a server that controls the travel operation of the automatic travel vehicle.

Background Art

Automatic travel vehicles that can travel along a travel guide line on a travel surface are known. The known automatic travel vehicle captures an image of the travel guide line attached on the travel surface, and controls a travel operation along the travel guide line based on the captured image. To cause the automatic travel vehicle to automatically stop at a spot, a mark is set at an adjacent portion of the spot, at a right side of the travelling direction of the travel guide line. When the automatic travel vehicle detects the mark set at the adjacent portion of the right side of the travelling direction of the travel guide line while the automatic travel vehicle is travelling along the travel guide line, the automatic travel vehicle is controlled to stop at the spot.

The automatic travel vehicle may travel in a first travelling direction and a second travelling direction, which are the opposite directions from each other, along the same travel guide line. When the automatic travel vehicle travels in the first travelling direction and the second travelling direction along the same travel guide line, the automatic travel vehicle can be stopped at one spot having one address number when the automatic travel vehicle travels in the first travelling direction, and the automatic travel vehicle can be stopped at the same one spot when the automatic travel vehicle travels in the second travelling direction. In this configuration, a mark indicating an action at the spot is attached at the adjacent portion of the travel guide line as follows. For example, one mark is attached at the right side of the travel guide line so that the mark is detectable by the automatic travel vehicle when the automatic travel vehicle travels in the first travelling direction along the travel guide line. Further, another mark is attached at the left side of the travel guide line so that another mark is detectable by the automatic travel vehicle when the automatic travel vehicle travels in the second travelling direction along the same travel guide line. Therefore, two marks are attached at the two adjacent portions of the travel guide line, which is at the right side and left side of the same travel guide line, with which the work load of attaching the marks along the travel guide line increases because the two marks are attached at the two adjacent portions of the travel guide line for each one of the spots set along the travel guide line.

SUMMARY

As one aspect of the present disclosure, the automatic travel vehicle is devised. The automatic travel vehicle includes a body, a drive unit to move the body on a travel surface along a travel guide line on the travel surface, a detection unit to detect a mark attached to one adjacent portion of the travel guide line for one spot set along the travel guide line, and a control unit to control an operation of the automatic travel vehicle based on the mark attached to the one adjacent portion of the travel guide line for the one spot and detected by the detection unit. The control unit interprets the mark attached to the one adjacent portion of the travel guide line at a first side of the body when the automatic travel vehicle travels along the travel guide line in a first travelling direction, and interprets the mark attached to the one adjacent portion of the travel guide line at a second side of the body when the automatic travel vehicle travels along the travel guide line in a second travelling direction, the first travelling direction and the second travelling direction being opposite directions along the travel guide line, and the first side and the second side of the body being opposite sides of the body.

As another aspect of the present disclosure, a method of controlling a travel operation of an automatic travel vehicle is devised. The method includes determining whether the automatic travel vehicle travels on a travel surface along a travel guide line in a first travelling direction or a second travelling direction, detecting a mark attached to an one adjacent portion of the travel guide line at a first side of the body when the determining determines that the automatic travel vehicle travels along the travel guide line in the first travelling direction, and detecting the mark attached to the one adjacent portion of the travel guide line at a second side of the body when the determining determines that the automatic travel vehicle travels along the travel guide line in the second travelling direction, the first travelling direction and the second travelling direction being opposite directions along the travel guide line, and the first side and the second side of the body being opposite sides of the body.

As another aspect of the present disclosure, a server to control an automatic travel vehicle along a travel guide line is devised. The server includes a memory to store travel-related information set for a mark attached at one adjacent portion of the travel guide line for one spot set along the travel guide line, a transmitter to transmit mark detection position information designating a mark detection side for the automatic travel vehicle, the mark detection position information including information designating a first side of the body as the mark detection side when the automatic travel vehicle travels along the travel guide line in a first travelling direction, and information designating a second side of the body as the mark detection side when the automatic travel vehicle travels along the travel guide line in a second travelling direction, the first travelling direction and the second travelling direction being opposite directions along the travel guide line, and the first side and the second side of the body being opposite sides of the body, and circuitry to control a travel operation of the automatic travel vehicle by transmitting the mark detection position information to the automatic travel vehicle via the transmitter.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7A is a scheme of wireless communication connection between one server and three AGVs, in which the three AGVs can access a sharing folder in the server;

FIG. 7B is a scheme of wireless communication connection between one server and three AGVs, in which each of the three AGVs reports a present location to an AGV file set for each of the AGVs in the server;

FIG. 7C is a scheme of an operation of the AGV with the server when the AGV reaches a junction-in and then exits from a junction-out;

FIG. 8A is a scheme of downloading software programs used for travel operation from the server to a note PC of the AGV;

FIG. 8B is a plan view of an input screen displayed on the note PC of the AGV to input a destination station number;

FIG. 8C is an example of contents of an AP switching table FIG. 9 is a flowchart illustrating steps of a process of travel operation of the AGV;

FIGS. 10A, 10B and 10C are another flowchart illustrating steps of a process of travel operation of the AGV;

FIGS. 11A and 11B are still another flowchart illustrating steps of a process of travel operation of the AGV;

Figure 1:
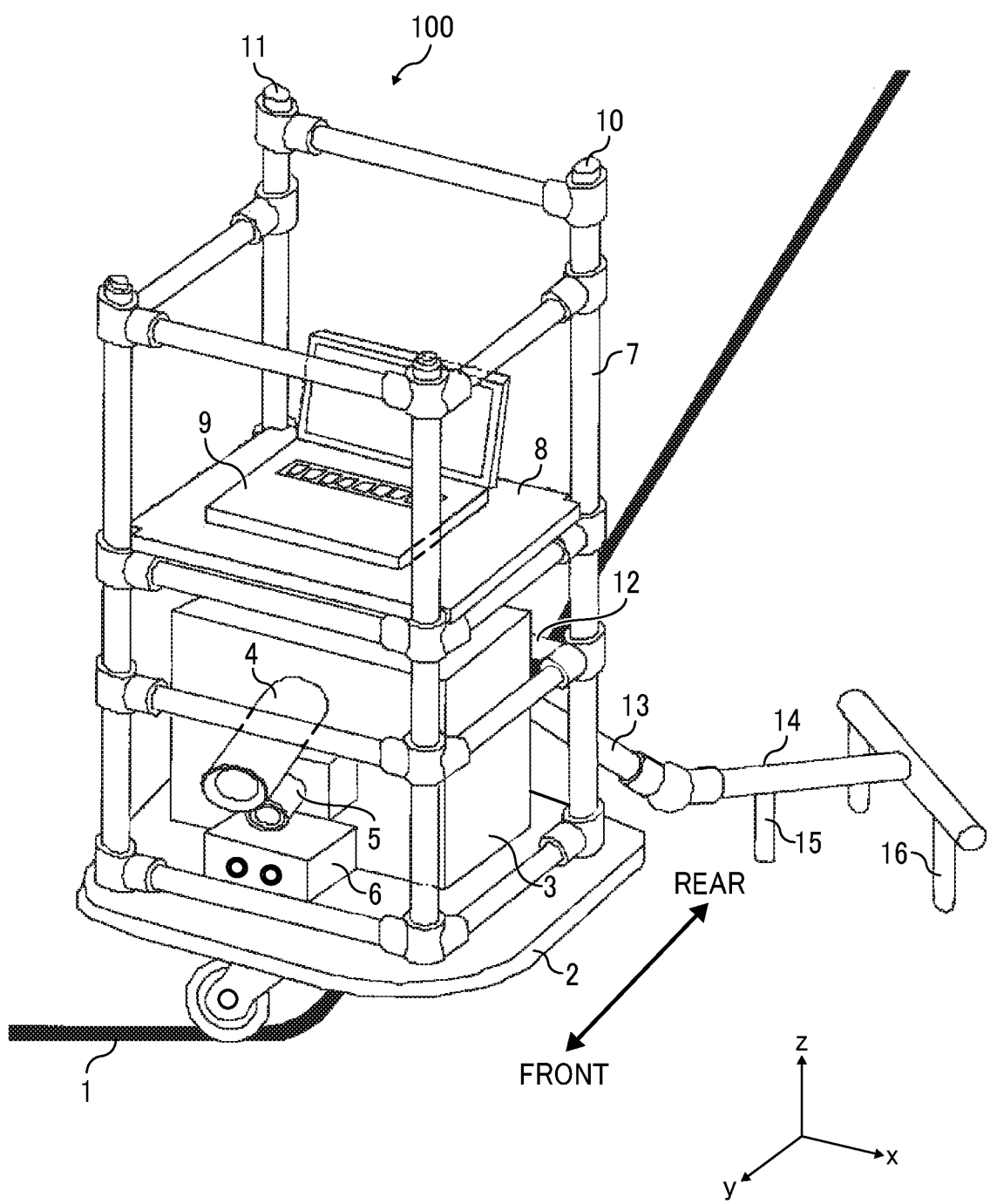
FIG. 1 is a perspective view of an automatic guided vehicle (AGV) of an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present disclosure.

In addition, it should be noted that the terminology used herein is for the purpose of describing particular embodiments only and is not intended to be limiting of the present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, a description is given one or more apparatuses or systems of one or more embodiments of the present disclosure.

A description is given of an automatic guided vehicle of one embodiment of the present disclosure with reference to the drawings. FIG. 1 is a perspective view of an automatic guided vehicle (AGV) 100 of an embodiment of the present disclosure, which is an example of an automatic travel vehicle that can be used, for example, as a traction vehicle in this description. The AGV 100 can automatically travel along a travel guide line 1 attached in advance on a travel surface such as a road surface, a floor surface or other surface. The travel guide line 1 is, for example, a black color tape having a width and adhered on the travel surface having yellow green color, but not limited hereto. For example, material, color, and attachment of the travel guide line 1 can be changed as long as the travel guide line 1 can be captured by an image capture device to be described later.

The AGV 100 includes, for example, a body 2, a battery case 3, an image capture device 4, a lighting device 5, and an object detection sensor 6. The battery case 3 set in the body 2 has a battery as a power source to supply power to electrical motors. The image capture device 4 used to capture an image of the travel surface in front of the body 2 is attached to the battery case 3. The image capture device 4 is an example of a detection unit in this description. The angle of the center line of a field of view of the image capture device 4 with respect to the travel surface is set to a given angle such as 35 degrees. The lighting device 5 irradiates light to a portion where the center line of a field of view of the image capture device 4 intersects the travel surface. The lighting device 5 has a light source driver 5a, and a light source 5b such as a fluorescent lamp.

The image capture device 4 includes, for example, a universal serial bus (USB) camera and a polarized lens. The polarized lens is attached in front of a lens of the USB camera to filter or block a reflection light reflected from the travel surface and the travel guide line 1 to suppress or prevent halation and highlight on an image capture screen.

The object detection sensor 6, which is an ultrasonic detection sensor, is disposed under the lighting device 5 and directed to the forward of the body 2. When the object detection sensor 6 detects an obstacle (e.g., person, object), the electrical motors that drives the body 2 is stopped, and the rotor rotation is locked. This locked status is continued while the object detection sensor 6 is detecting the obstacle. This locked status is cancelled when the object detection sensor 6 does not detect the obstacle.

The body 2 includes a pipe frame 7, which is a protection frame covered by an elastic material to absorb the impact when the body 2 contacts with something, a plate 8, and a note personal computer 9 (note PC 9) used as a computer. The note PC 9 is fixed on the plate 8 fixed to the pipe frame 7. The pipe frame 7 is disposed with a start switch 10 and a stop switch 11, which are used as one touch button. The start switch 10 is used to instruct a start of travelling and to cancel a stop (i.e., instruct a re-start of travelling), and the stop switch 11 is used to instruct a stop of travelling such as an emergency stop. When a user presses the start switch 10, the AGV 100 starts to travel. When the user presses the stop switch 11 while the AGV 100 is travelling, the AGV 100 stops the travelling, and when the user presses the start switch 10 again, the AGV 100 starts to travel again.

A horizontal pipe 12 is attached to the pipe frame 7 at the rear side of the battery case 3. A towing arm 13 is attached to the horizontal pipe 12 while the towing arm 13 is rotatable about the center of the towing arm 13. A connection arm 14 is attached to a free end of the towing arm 13 via a ball joint, and the connection arm 14 has hook devices 15 and 16 to hook with a dolly or cart to be towed by the AGV 100.

Figure 2:
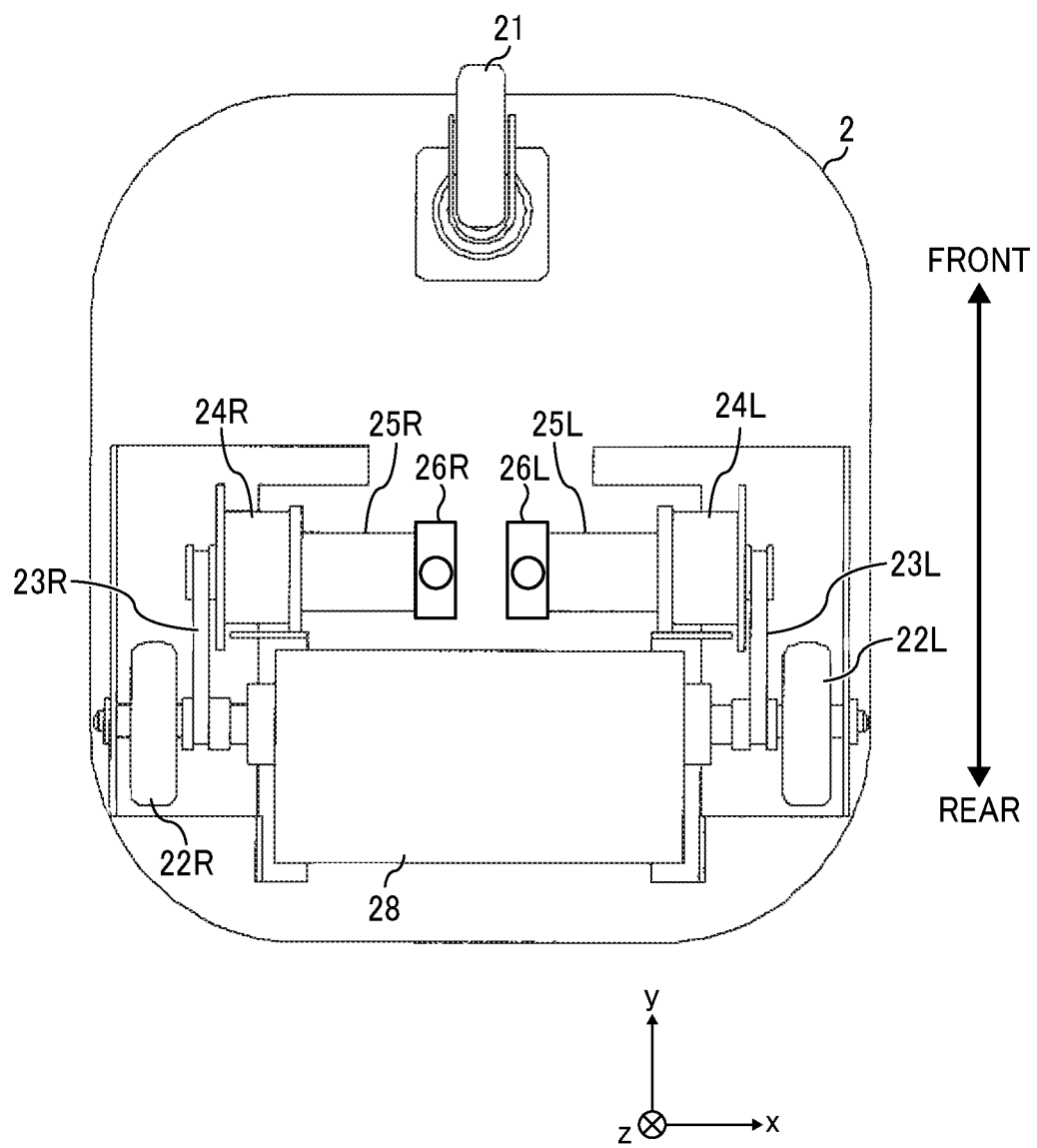
FIG. 2 is a plan view of a bottom face of a body 2 of the AGV of FIG. 1.

FIG. 2 is a plan view of a bottom face of the body 2 of FIG. 1, which is viewed from the bottom of the body 2. As indicated in FIG. 2, the body 2 is disposed with a front wheel 21, and rear wheels 22R and 22L. The front wheel 21 is a caster having a wheel, a wheel shaft and a wheel shaft supporter, in which the wheel rotates about the wheel shaft, and the wheel shaft supporter is rotatable about a vertical axis. Each of the rear wheels 22R and 22L is used as a drive wheel (i.e., drive unit) that can be rotated by electrical motors 25R and 25L, used as drivers, via timing belts 23R and 23L and decelerators 24R and 24L. The electrical motors 25R and 25L are respectively connected to rotary encoders 26R and 26L. The rotary encoders 26R and 26L respectively generate an electrical signal such as a speed-indicating pulse signal having a frequency proportional to the rotation speed of the rotor of the electrical motors 25R and 25L. The motor drivers 27R and 27L that respectively rotate the electrical motors 25R and 25L are encased in a case 28, and the motor drivers 27R and 27L respectively supply power to the electrical motors 25R and 25L.

Figure 3:
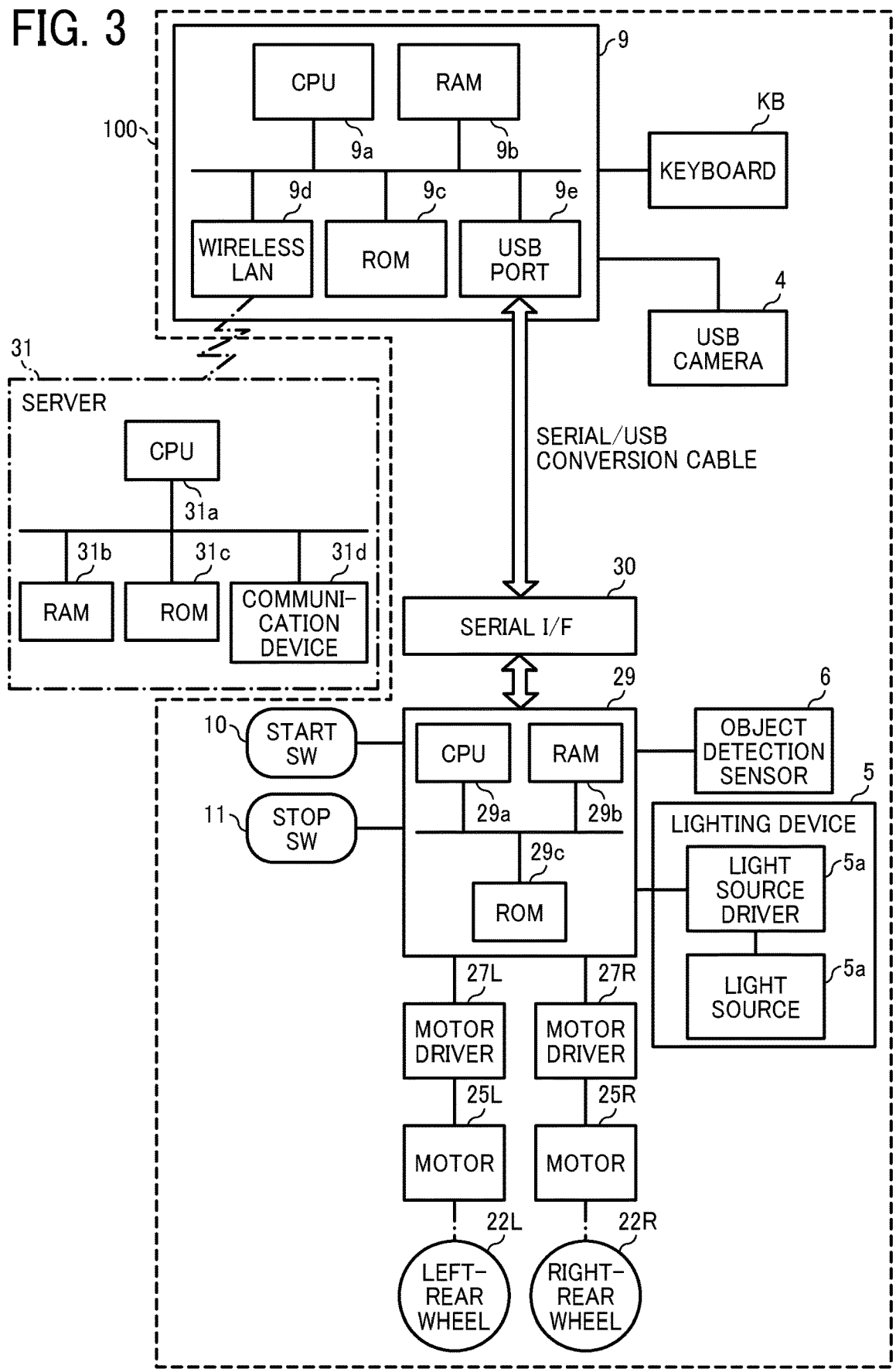
FIG. 3 is a block diagram of a schematic configuration of the AGV of FIG. 1 including electrical connections.

FIG. 3 is a block diagram of a schematic configuration of the AGV 100. As indicated in FIG. 3, the note PC 9 includes, for example, a central processing unit (CPU) 9a, a random access memory (RAM) 9b, a read only memory (ROM) 9c, a communication device 9d (e.g., wireless LAN), and a USB port 9e, and further a microcomputer 29 includes, for example, a central processing unit (CPU) 29a, a random access memory (RAM) 29b, and a read only memory (ROM) 29c. The communication device 9d can be used as a receiver that receives information from the server 31, and a transmitter that transmits information to the server 31. As indicated in FIG. 3, the motor drivers 27R and 27L and others are electrically connected to the microcomputer 29. The microcomputer 29 is encased in the case 28 (FIG. 2), and can be electrically connected to the note PC 9 via a serial interface (I/F) 30. The USB camera of the image capture device 4 (FIG. 1) is connected to the USB port 9e of the note PC 9. The note PC 9 includes a wireless local area network (LAN) to communicate information wirelessly with an access point (AP) that is coupled to a server 31, which is a computer disposed at a place such as a ground.

As indicated in FIG. 3, the server 31 includes, for example, a central processing unit (CPU) 31a, a random access memory (RAM) 31b, and a read only memory (ROM) 31c, and a communication device 31d. With employing this configuration, the note PC 9 can communicate information wirelessly with the server 31 via the communication device 31d, which can be used as a transmitter that transmits information to the note PC 9 of the AGV 100, and a receiver that receives information from the note PC 9 of the AGV 100. In the embodiment, for example, two access points AP 1 and AP 2 (see FIG. 4) are disposed. The note PC 9 alone, the microcomputer 29 alone, or the note PC 9 and the microcomputer 29 can be used as control unit of the AGV 100.

The note PC 9 disposed on the AGV 100 is installed with one or more control programs to control operations of the AGV 100 such as automatic travelling and automatic stop. Various controls can be performed by reading and executing the control programs. For example, the note PC 9 can generate a travel operation control command to be used to travel the AGV 100 along the travel guide line 1 on the travel surface, and transmits the travel operation control command to the microcomputer 29. The note PC 9 recognizes or interprets a coded mark such as a mark 110 having an address number to be described later attached at each of spots having a corresponding address number along the travel guide line 1 on the travel surface. The note PC 9 interprets the travel operation instruction (e.g., action: right turn, left turn, move straight, stop) set for the mark 110 having the corresponding address number to generate the travel operation control command associated to the travel operation instruction, and transmits the travel operation control command to the microcomputer 29. The travel operation control command includes, for example, a start command, a move straight command, a low speed command, a high speed command, a right steering command, a left steering command, and a stop command.

The microcomputer 29 can be used to adjust a drive speed of the rear wheels 22R and 22L driven by the electrical motors 25R and 25L at low speed/high speed based on an instruction of low speed/high speed. The motor drivers 27R and 27L respectively set a speed instruction transmitted from the microcomputer 29 as a target speed value, and uses a pulse frequency indicating the speed (i.e., detection speed) generated by the rotary encoders 26R and 26L as a feedback speed value. Then, the motor drivers 27R and 27L respectively control the rotation speed of the electrical motors 25R and 25L so that the feedback speed value becomes the target speed value. Further, when the microcomputer 29 receives a right steering instruction, the microcomputer 29 stops the rotation of the right rear wheel 22R while continuing the rotation of the left rear wheel 22L, and when the microcomputer 29 receives a left steering instruction, the microcomputer 29 stops the rotation of the left rear wheel 22L while continuing the rotation of the right rear wheel 22R.

Figure 4:
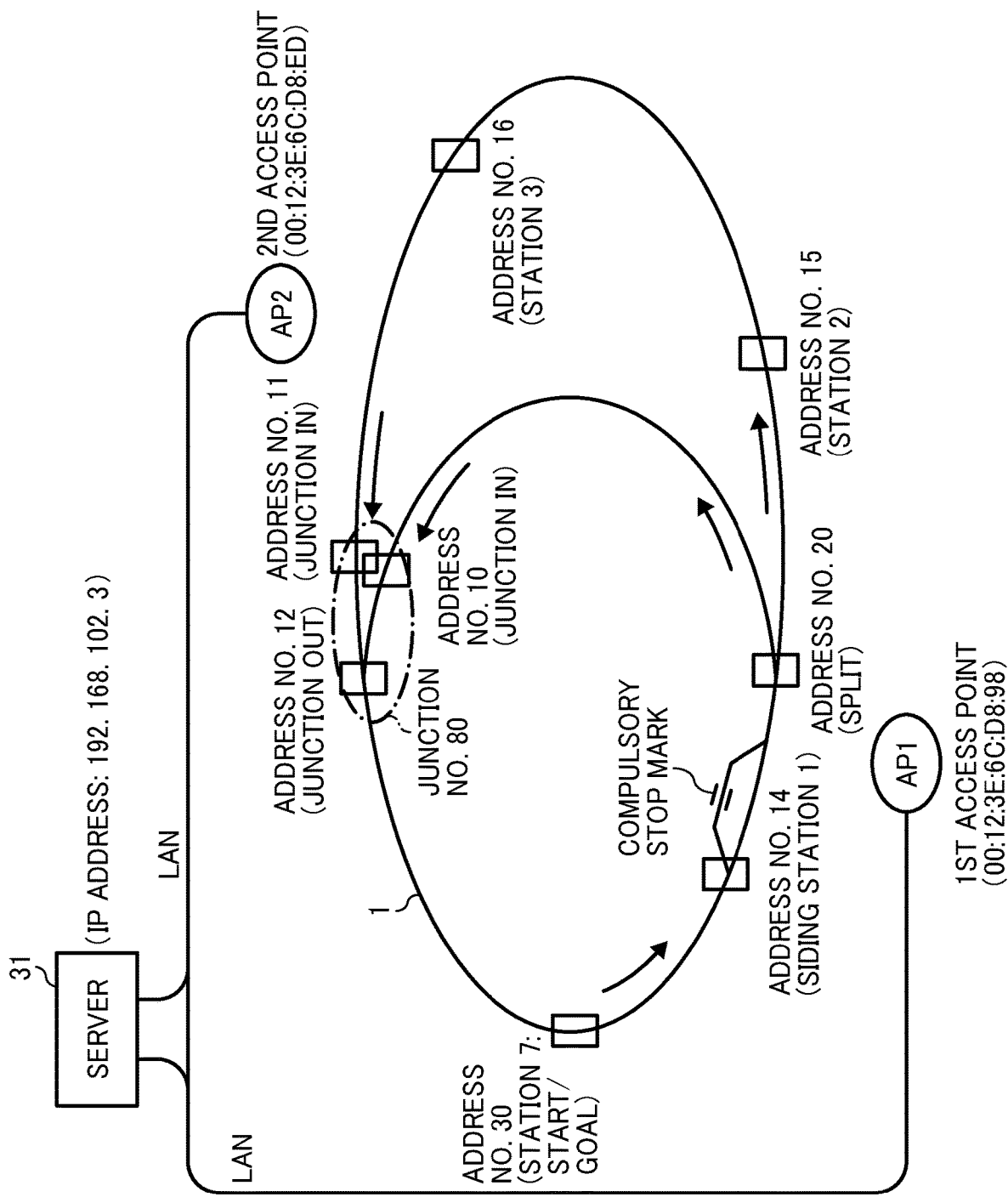
FIG. 4 is a schematic view of an example of a travel operation schedule route used for travelling the AGV of FIG. 1.

FIG. 4 is a schematic view of an example of a travel operation schedule route set by attaching the travel guide line 1 on the travel surface. In this example case, it is assumed that an address number 30 is defined as the start spot and the goal spot, and the automatic guided vehicle (AGV) 100 travels along the travel guide line 1 in the counter clockwise direction from the start spot having the address number 30. Further, address numbers and/or station numbers are set for each one of spots set along the travelling direction as indicated by square shapes in FIG. 4. The spots include, for example, a spot used as an entry to a siding line, a loading spot and a unloading spot used for a package transportation, a spot used at split, a spot used as an entry of a junction, and a spot used as an exit of a junction. The spots are set with corresponding address numbers and marks. The mark is a coded mark having information of identification code indicating a specific address number and a specific action at a specific spot set in a travel operation schedule table. The coded mark can be set for each of the above mentioned spots having the address number by attaching a tape on the travel surface near the spot. As to the travel operation schedule route of FIG. 4, a plurality of AGVs 100 having the same configuration and same capabilities are operated simultaneously. For, example, three AGVs 100 such as an AGV 001, an AGV 002, and an AGV 003 are operated simultaneously.

The server 31 stores a sharing folder such as a "/robot" folder generated by using a network file system (NFS) of a given operating system (OS) such as UNIX (registered trademark). The AGV 100 can access the folder storing, for example, an AGV control program (/robot/agv.soft), a travel operation schedule table (/robot/DRIVE_PLAN) of each of the AGVs 100 (e.g., AGV 001, AGV 002, AGV 003), and an AP switching table (/robot/AP_PLAN). The AP switching table is a look up table (LUT) that correlates an access point (AP) close to each one of the address numbers.

The AGV control program (/robot/agv.soft) is embedded with an AGV drive application and a location recognition application. The AGV control program is further embedded with a junction management application, a travel operation schedule table management file (/robot/DRIVE_PLAN), and an AP switching table management file (/robot/AP_PLAN). The travel operation schedule table (/robot/DRIVE_PLAN) is, for example, a book (e.g., table) generated by a spreadsheet such as Excel (registered trademark).

Table 1 is an example of the travel operation schedule table that is set for the travel operation schedule route of FIG. 4. In Table 1, the station number set for the travel operation schedule table is used as a row number of a book (i.e., table) such as Excel (registered trademark), in which each of the station numbers (i.e., each line) indicates one travel operation schedule. Further, Table 1 includes information of a station spot (e.g., transit spot), a siding spot, and a junction spot set on a loop route starting from the start spot to the goal spot in one direction, and each of the spots is used as a node on the loop route. Each cell in the book (i.e., table) in the same line is input with information of the spot corresponded to the cell. The most-left-end cell is used to input data of the station number, and the cell next to the most-left-end cell is used to input data of the start spot, and data of each spot is input to the corresponding cell from the left to right in the same one line along the travelling direction of the AGV 100. Further, the station number also used as the row number indicates a destination spot of the AGV 100 in one travel operation schedule (i.e., one travel route), which means the station number is set as a target spot where the AGV 100 is to reach and stop to perform a specific action when or after the AGV 100 passes spots defined by the spot information in each cell set for the concerned row number. The spot information is input in each cell by using comma separated value (CSV). In Table 1, each of the spot information includes, for example, the address number, the spot type, and the action type, which indicate a travel operation instruction. The address number are expressed with decimal numbers, and the spot type and the action type are expressed with alphabet letters. The alphabet letters indicating the spot type and the action type is defined in Table 1(annex) attached to Table 1 used as the travel operation schedule table.

TABLE 1

| Station number | Start/Goal | | | | | |
|---|---|---|---|---|---|---|
| 1 | 30: G | 14: SPL: 1 | 20: L | 10: JI: 80 | 12: JO: 80 | |
| 2 | 30: G | 14: SPL: 1 | 20: R | 15: S: 2 | 16: S: 3 | 11: JI: 80 | 12: JO: 80 |
| 3 | 30: G | 14: SPL: 1 | 20: L | 15: S: 2 | 16: S: 3 | 11: JI: 80 | 12: JO: 80 |

Data format in cell: address number: action: parameter
(annex)
Alphabet letters indicate actions set for travel operation schedule table [Table 1]

| S: Station | —: None | R: Split to right | L: Split to left | SPR: station platform right |
|---|---|---|---|---|
| JI: Junction In | JO: Junction Out | G: Goal | | SPL: station platform left |

For example, Table 2 defines contents of each of the spot information in each cell of the first row of the travel operation schedule table (see Table 1). As indicated in Table 1, the first row of the travel operation schedule table sets the station number 1 as the destination spot. In this example case, the same spot is used as the start spot and the goal spot (i.e., return point).

TABLE 2

| Address number: Action | Contents | Operation |
|---|---|---|
| 30: G | Address number 30 is goal. | Stop and display station number input screen. |
| 14: SPL: 1 | Address number 14 is station platform (left), and station number is 1. | Turn left when split is detected, stop at compulsory stop mark, and display station number input screen. |
| 20: L | Address number 20 is split, and turn left. | Turn left when split is detected. |
| 10: JI: 80 | Address number 10 is Junction In, and Junction number is 80. | Read use status of Junction number 80 file in server. When file is not being used, lock Junction number 80 file, and enter. When file is being used, stop until Junction number 80 file is unlocked. |
| 12: JO: 80 | Address number 12 is Junction Out, and Junction number is 80. | Set Junction number 80 file in server as unlocked. |

Table 2 defines one example case that the station number 1 of the travel operation schedule table is used to operate the AGV 100, in which the AGV 100 is guided to the address number 30 used as the goal spot. Specifically, the AGV 100 turns left at the address number 14 and stops at the compulsory stop mark, the AGV 100 turns left at the address number 20, the AGV 100 reads the use-status of Junction number 80 file in the server 31 when the AGV 100 comes at the address number 10, and the AGV 100 unlocks Junction number 80 file in the server 31 when the AGV 100 leaves the address number 12.

The mark such as the coded mark attached along the travel guide line 1 on the travel surface (see FIG. 4) can be, for example, pasted on the travel surface by using black vinyl tape having a given width such as 19 mm. The field of view of the USB camera of the image capture device 4 is set, for example, 10 cm for the lateral direction and 20 cm for the longitudinal direction, and the USB camera can capture an image having a given pixel size (e.g., 160 dots for the lateral direction, 120 dots for the longitudinal direction). Therefore, the image capturing screen of the USB camera can display, for example, a trapezoid image having a 10-cm short side in the lateral direction at the 15-cm distance from the image capture device 4 on the travel surface, and a 15-cm short side in the lateral direction at the 20-cm distance from the image capture device 4 on the travel surface.

Figure 5A:
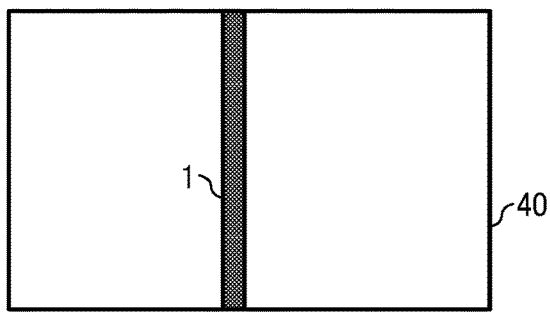
FIG. 5A is an example of an image of the travel guide line captured by an image capture device of the AGV of FIG. 1.
Figure 5B:
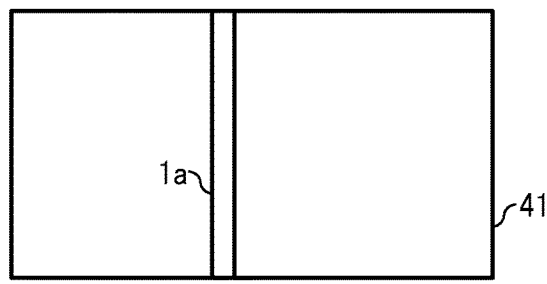
FIG. 5B is an example of an image that has received an extraction process to extract a contour of the image of FIG. 5A.
Figure 5C:
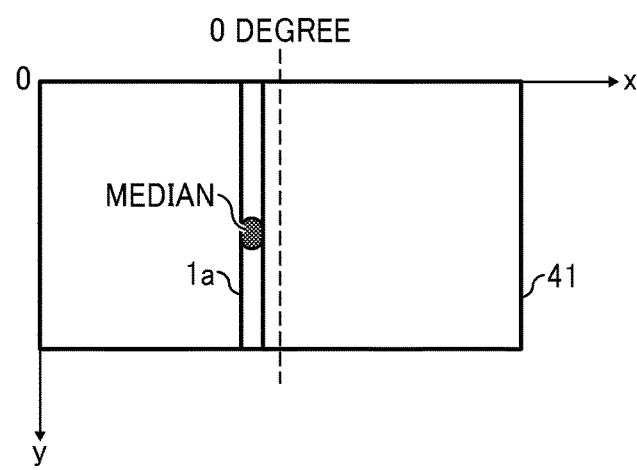
FIG. 5C indicates feature items extracted from the contour of the image.

FIG. 5A is an example of an image of the travel guide line 1 captured by the image capture device 4 of FIG. 1. FIG. 5B is an example of an image that has received the extraction process to extract a contour of the image of FIG. 5A captured by the image capture device 4. FIG. 5C indicates feature items extracted from the contour of the image. For example, the note PC 9 acquires a captured image 40 (e.g., 160 dots for the lateral direction, 120 dots for the longitudinal direction) from the image capture device 4 as indicated in FIG. 5A, and extracts a contour 1a (see FIG. 5B) of the travel guide line 1 from the captured image 40. The contour indicates the outline of the travel guide line 1. The contour 1a can be extracted, for example, by using the image processing library executed in the note PC 9.

Then, the feature items of the contour 1a are acquired from the captured image 41 (FIG. 5C), wherein the contour 1a of the travel guide line 1 is extracted from the captured image 41. The feature items of the contour 1a includes, for example, an area size, a median, and an angle deviated from the reference line L extending in the longitudinal direction of the captured image 41. In this process, the upper left corner of the captured image 41 is set as the origin O (0, 0), the right direction is set as +x direction, and the lower direction is set as +y direction as indicated in FIG. 5C, and coordinates (x, y) of the median of the contour 1a is calculated based on the origin O (0, 0). The coordinates (x, y) of the median of the contour 1 can be calculated in a range defined by the x-coordinate set from 0 to 159, and the y-coordinate set from 0 to 119. Further, the angle θ of the contour 1a is calculated by using the reference line L as the reference in a range of −90 degrees in the left direction and +90 degrees in the right direction.

Figure 6A:
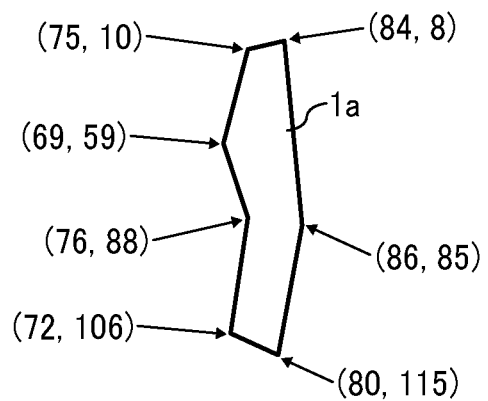
FIG. 6A is an example of a contour extracted from a captured image.

FIG. 6A is an example of the contour 1a extracted from the captured image. In an example of FIG. 6A, the contour 1a is composed of seven lines. The coordinates of cross points of adjacent two lines are, for example, (75, 10), (69, 59), (76, 88), (72, 106), (84, 8), (86, 85), and (80, 115). In this example case, the median and the angle θ of the contour 1a are calculated as follows, in which "a tan" means arc tangent (=tan$^{-1}$).

median $x$=(maximum value of $x$+minimum value of $x$+1)/2=(86+69+1)/2=78 median $y$=(maximum value of $y$+minimum value of $y$+1)/2=(115+8+1)/2=62

θ=$a$ tan((maximum value of $y$−minimum value of $y$+1)/(maximum value of $x$−minimum value of $x$+1))=$a$ tan((115−8+1)/(86−69+1))=81 degrees.

Since the reference line L, set at the right above direction, is used set as zero degree (i.e., reference) for calculating the angle θ of the contour 1a, the angle θ of the contour 1a becomes 90−81=9 degrees. Since the angle θ is required to indicate the left or right direction, the plus or minus sign of the angle θ indicates the left or right direction as follows.

If ("y" when "x" becomes the minimum value)<("y" when "x" becomes the maximum value), it is determined as the left direction (minus sign (−)).

If ("y" when "x" becomes the minimum value)≥("y" when "x" becomes the maximum value), it is determined as the right direction (plus sign (+)).

In an example case of FIG. 6A that the contour 1a has seven coordinates, since "y" when "x" becomes the minimum value is 59, and "y" when "x" becomes the maximum value is 85, it becomes the left direction with the angle of −9 degrees.

The area size of the contour 1a can use a value acquired from the image processing library.

In an example case of FIG. 6A, the median: (78, 62), the angle: (−9), and the area size (1500) mm$^2$ are calculated for the contour 1a. In this example case, it is assumed that the extracted contour can be determined as an effective contour of the travel guide line 1 if the area size of the extracted contour is within a range from 950 mm$^2$ (19 mm×50 mm) to 5700 mm$^2$ (19 mm×300 mm). Therefore, the contour having the area size from 950 mm$^2$ to 5700 mm$^2$ is determined as the effective contour. The area size limitation is set to prevent that stains on the travel surface is erroneously detected as a contour. Therefore, in this example case, a contour having the area size less than 950 mm$^2$ is not determined as the contour of the tape used as the travel guide line 1 and the coded mark, and a contour having the area size greater than 5700 mm$^2$ is not determined as the contour of the tape used as the travel guide line 1 and the coded mark.

A description is given how to set the steering direction for the AGV 100 based on the median and the angle θ of the contour 1a. For example, the AGV 100 can be steered as follows based on "x" coordinates of the median of the contour 1a.

If 60≤x≤100, move straight;
If x<60, left steering; and
If 100<x, right steering.

Further, for example, the AGV 100 can be steered as follows based on the angle θ of the contour 1a.

If angle θ<20 degrees, move straight;
If angle θ≥−20 degrees, left steering; and
If angle θ≥+20 degrees, right steering.

Figure 6B:
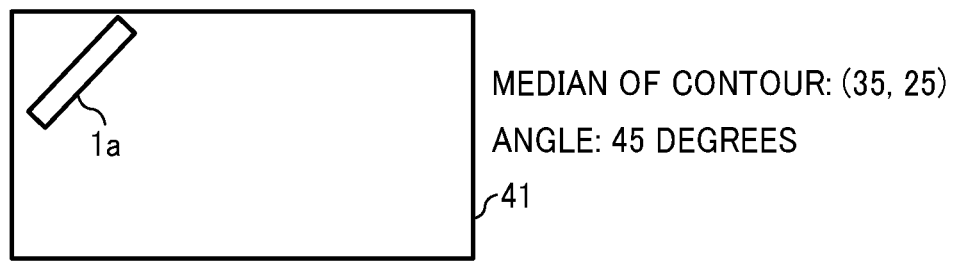
FIG. 6B is an example of a contour extracted from a captured image when the AGV is steered to a right direction too much.

The finally-determined steering direction can be determined based on a relationship of the median and the angle θ of the contour 1a. For example, if the AGV 100 is steered too much to the right as indicated in FIG. 6B, and then the finally-determined steering direction is set based on having the angle θ=+45 degrees alone of the contour, and the right steering is further continued, the travel guide line 1 becomes out of the field of view of the camera. Therefore, in an example case of FIG. 6B that the contour 1a has the median (35, 25) and the angle θ=+45 degrees, the median is used to determine the finally-determined steering direction, in which the left steering is determined. Therefore, the finally-determined steering direction is determined based on a relationship of the median and the angle θ of the contour 1a so that the travel guide line 1 is constantly around the center of the captured image 40 similar to a driving of a vehicle by a person.

Figure 6C:
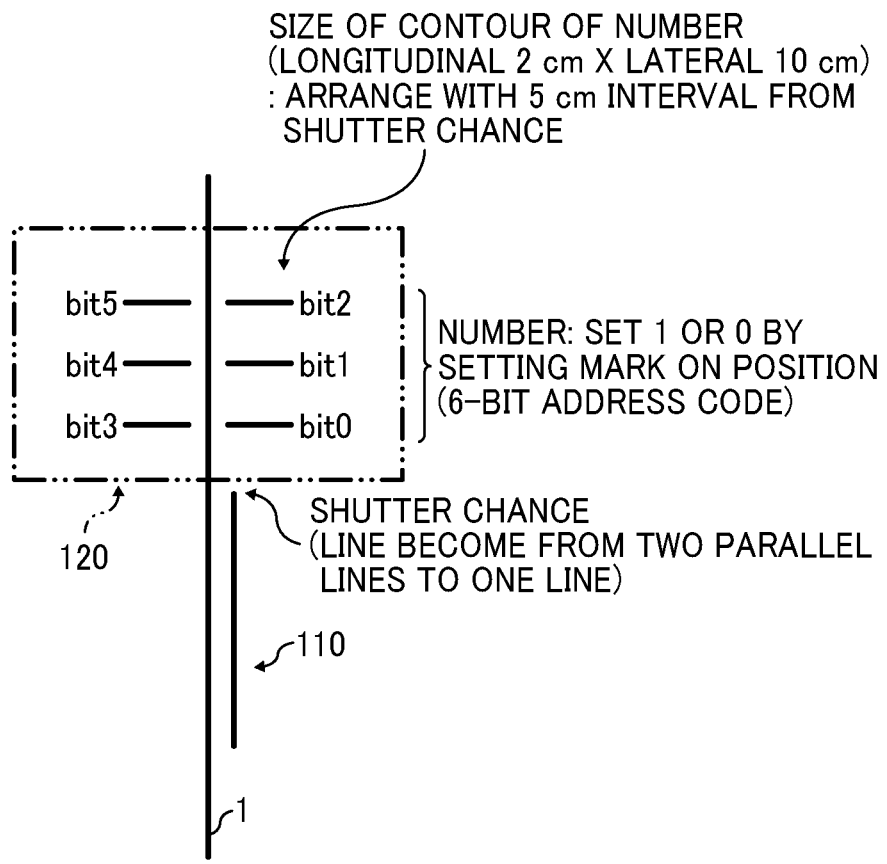
FIG. 6C is a plan view of an example of a coded mark attached along a travel guide line.

FIG. 6C is a plan view of an example of the coded mark attached along the travel guide line 1. As indicated in FIG. 6C, a mark 110 having the address number having a given shape can be attached at the right side of the travel guide line 1, set for a course (i.e., travel operation schedule route). For example, the mark 110 having the address number is attached along the travel guide line 1 by setting the length of 20 cm or more, and setting the difference of angle of the contour of the travel guide line 1 and the contour of the mark 110 with less than 20 degrees. When the AGV 100 detects the contour of the mark 110 having a certain shape, the AGV 100 determines that the mark 110 having the address number is detected, and waits a shutter chance. When the number of the contours in the captured image becomes one from two at the end of the maker 110, the AGV 100 is in the shutter chance. When the shutter chance has come, all of number marks (e.g., coded mark) can be captured as the captured image. When the contour is extracted from a shutter chance image 120 of FIG. 6C, seven contours including the travel guide line 1 are detected.

The median of each of the contours is defined as follows.
median of contour of travel guide line 1: M(x, y),
median of contour of first number (bit 0 position): S1(x, y),
median of contour of second number (bit 1 position): S2(x, y),
median of contour of third number (bit 2 position): S3(x, y),
median of contour of fourth number (bit 3 position): S4(x, y),
median of contour of fifth number (bit 4 position): S5(x, y), and
median of contour of sixth number (bit 5 position): S6(x, y).

The numbers set for each of bit 0-bit 5 positions are set with an interval (e.g., 5 cm) from the shutter chance. By detecting a position where the detected median of S1 to S6 exist by referring Table 3, it is detected whether the bit value of 1 is set for each of bit 0 to bit 5.

TABLE 3

| | Position with respect to contour of travel guide line (Right/Left of M(x)) | Y coordinate of contour | Bit value |
| --- | --- | --- | --- |
| bit 0 | Right | 0 ≤ y ≤ 39 | 1 |
| bit 1 | Right | 40 ≤ y ≤ 79 | 1 |
| bit 2 | Right | 80 ≤ y ≤ 119 | 1 |
| bit 3 | Left | 0 ≤ y ≤ 39 | 1 |
| bit 4 | Left | 40 ≤ y ≤ 79 | 1 |
| bit 5 | Left | 80 ≤ y ≤ 119 | 1 |

To prevent that foreign particles on the travel surface is detected as the number contour (i.e., error detection), the limitation can be set for the area size such as from 100 mm$^2$ to less than 200 mm$^2$ and angle of 60 degrees or more. In an example case of FIG. 6C, when the number contour value is "1," the number becomes 3F for hexadecimal number or 63 for decimal number.

Figure 10B:
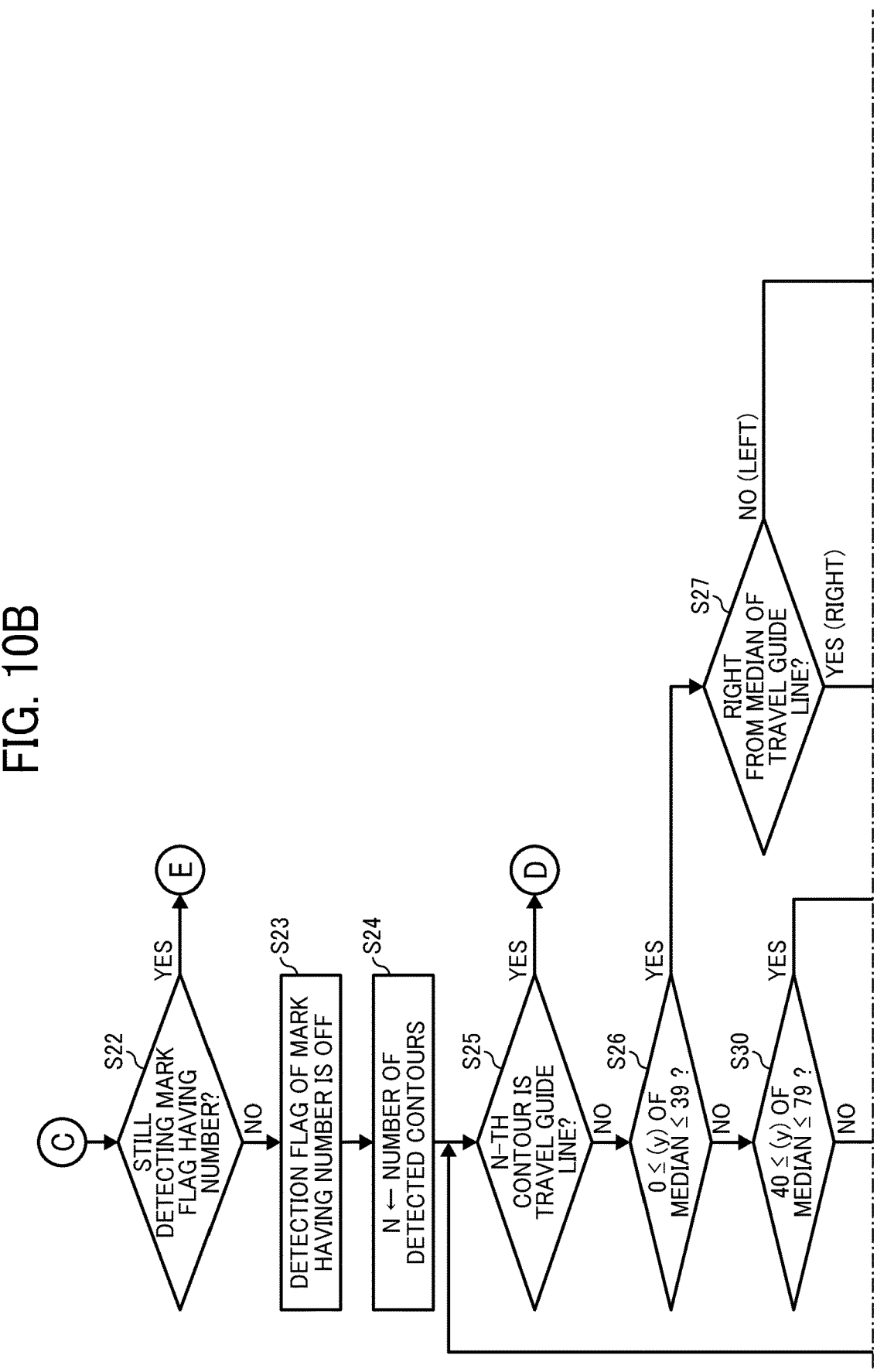
Figure 11B:
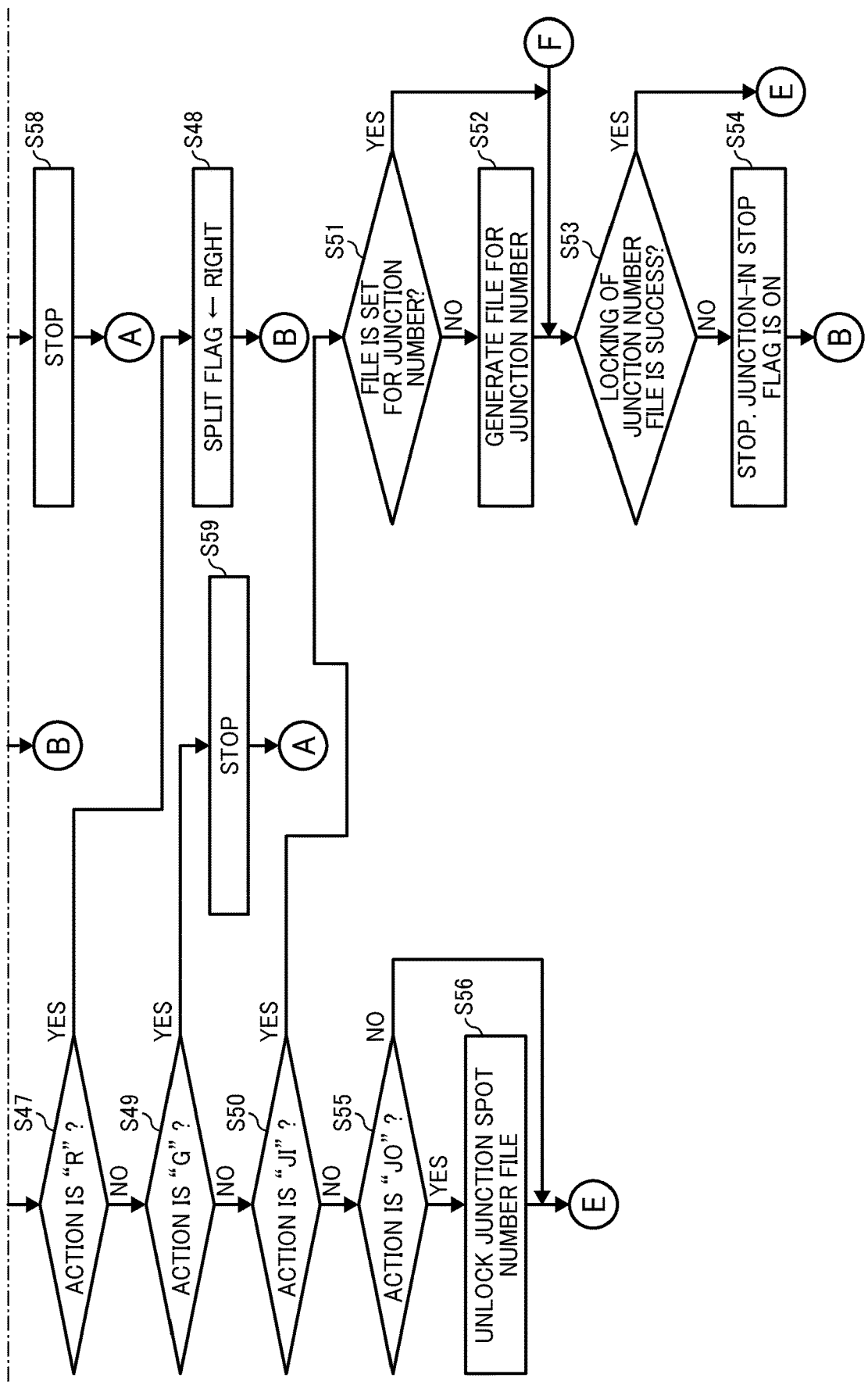

A description is given of a process of controlling the travel operation of the note PC 9 of the AGV 100 with reference to FIGS. 7 to 11 by attaching step numbers set for FIGS. 9 to 11.

At first, when the note PC 9 of the AGV 100 is supplied with power, and the AGV drive application is activated in the note PC 9, the note PC 9 performs the following sequence. Specifically, as indicated in FIG. 7A, the note PC 9 of the AGV 100 (e.g., AGV 001) having a "/robot" folder accesses a sharing folder having a name of "/robot" folder in the server 31 (step S1). The access to the sharing folder is performed by using a network file system (NFS) of a given operating system (OS) such as UNIX (registered trademark). Another AGV 100 having the same configuration and capabilities such as AGV 002 and AGV 003 can also access the sharing folder having the name of "/robot" folder in the server 31. With employing this configuration, a plurality of AGVs 100 (e.g., AGV 001 to AGV 003) and the server 31 can be configured to access the sharing folder by using a wireless communication, in which at least one server and a plurality of the AGVs are employed.

Then, as indicated in FIG. 8A, the note PC 9 downloads "/robot/agv.soft," "/robot/DRIVE_PLAN," and "/robot/AP_PLAN" from the server 31 (step S2). Then, the note PC 9 stores the downloaded "/robot/agv.soft," "/robot/DRIVE_PLAN," and "/robot/AP_PLAN" in a memory such as a hard disk drive (HDD) in the note PC 9. Then, the note PC 9 executes the "/robot/agv.soft" (step S3). Then, the note PC 9 checks whether the server 31 has "/robot/AGV001 file." If the server 31 does not have "/robot/AGV001" file, "/robot/AGV001" file is generated and stored in the server 31 (step S4). The "/robot/AGV001" file is used to identify the AGV 001, which is one of the AGV 001 to AGV 003 being operated. The "/robot/agv.soft," "/robot/DRIVE_PLAN," and "/robot/AP_PLAN" can be stored in a memory such as a hard disk drive (HDD) in the server 31.

Then, a user inputs a destination station number to the note PC 9 of the AGV 100 by using an input device such as a keyboard, and then presses the start switch 10. When the start switch 10 is pressed by the user, the note PC 9 identifies the travel operation schedule corresponding to the input destination station number (i.e., row number of Table 1) from the travel operation schedule table (Table 1), and the AGV 100 starts to travel (step S5, S6, S7). In this example case, it is assumed that the destination station number 3 (i.e., row number 3 of Table 1) is input to the note PC 9 of the AGV 100, and the AGV 100 is at the start spot having the address number 30 (see FIG. 4) when the destination station number 3 is input to the note PC 9 of the AGV 100. When the destination station number 3 (i.e., row number 3 of Table 1) is input to the input screen (e.g., display) of the note PC 9 of the AGV 100, the display of the note PC 9 is switched from the left screen of FIG. 8B to the right screen of FIG. 8B.

After the AGV 100 starts to travel, the following sequences (i.e., step S8 and subsequent steps) are performed repeatedly by setting an interval time for processing. The sequences includes a sequence 1 for capturing an image of the travel surface by using the image capture device 4 (step S8), a sequence 2 for detecting the travel guide line 1 and generating a travel operation control command based on a captured image (steps S11 to S15), and detecting identification code such as address number (step S14 to S16-S20-S21-S8 to S11-S22 to S41), a sequence 3 for searching spot information corresponding to detected identification code such as address number (steps S42, SS43), and a sequence 4 for controlling a travel operation of the AGV 100 based on the spot information extracted by searching process (step S42 to S59, S12).

When the identification code (e.g., address number) of a spot detected as the station number by the AGV 100 matches the destination station number that was input to the note PC 9, the AGV 100 stops at the concerned station, and the display of the note PC 9 displays a station number input screen, which is not yet input with a station number. Then, if the user presses the start switch 10 without inputting the station number, the AGV 100 starts to travel again in the same direction, and when the AGV 100 reaches the goal spot (i.e., start spot), the AGV 100 stops at the goal spot.

For example, it is assumed that the AGV 100 travels along the travel guide line 1 (see FIG. 4) by setting the destination station number "3," in which the third row (i.e., station number 3) of Table 1 is used as the travel operation schedule (see Table 1), When the AGV 100 starts to travel from the start spot (i.e., station number 30), the AGV 100 detects the address number of "14" as an identification code that the AGV 100 detects for the first time after starting the travelling from the start spot. As indicated in the travel operation schedule (Table 1), since data (i.e., spot information) set in the first cell of the third row (i.e., station number 3) in Table 1 is "14: SPL:1," the AGV 100 detects that the AGV 100 is at the station 1. Since the destination station number is "3," the note PC 9 instructs the AGV 100 not to stop at the station 1, and writes "14" to the "/robot/AGV001" file stored in the server 31 (step S41) as indicated in FIG. 7B. Then, the note PC 9 refers to the media access control (MAC) address of "00:12:3E:6C:D8:98" set for the address number 14 in the AP switching table (FIG. 8C), and sets the access point (AP) of wireless LAN connection used for the note PC 9 as "00:12:3E:6C:D8:98". FIG. 8C is an example of contents of the AP switching table. With employing this configuration, the AP address can be switched based on each of the spots set on the travel route, and the wireless LAN connection used by the note PC 9 can be switched to a wireless access point (AP) that is the closest to the spot having the coded mark including the identification code.

Since the destination station number input to the note PC 9 is "3," the AGV 100 does not perform the action (i.e., SPL) set in the spot information of the address number 14, and further continues to travel along the travel guide line 1. Then, when the AGV 100 reads the spot information of the address number 20, since the spot information is "20: R" (see Table 1), the AGV 100 travels to the right route when the AGV 100 detects the split, and the note PC 9 writes "20" to the "AGV001" file stored in the server 31. Since the MAC address of "00:12:3E:6C:D8:98" is set for the address number 20 in the AP switching table (FIG. 8C), the note PC 9 sets the access point (AP) of wireless LAN connection used for the note PC 9 as "00:12:3E:6C:D8:98." When the AGV 100 passes the spot of "20" and continues to travel along the travel guide line 1, the AGV 100 reaches the split. If two contours are detected and the angle difference between the two contours is, for example, 20 degrees or more, the AGV 100 recognizes or interprets that the AGV 100 is detecting the split (steps S14, S16, S20), in which a tape indicating the split is attached on the travel surface without overlapping with the travel guide line 1. Then, the AGV 100 selects a route having a median to the right side, and continues to travel along the right-split route (see FIG. 4).

Then, when the AGV 100 reads the spot information of the address number 15, since the spot information is "15:S: 2" (see Table 1), the AGV 100 is at the station 2, and the note PC 9 writes "15" to the "AGV001" file stored in the server 31. Since the MAC address of "00:12:3E:6C:D8:98" is set for the address number 15 in the AP switching table (FIG. 8C), the note PC 9 sets the access point (AP) of wireless LAN connection used for the note PC 9 as "00:12:3E:6C:D8:98." Since the destination station number input to the note PC 9 is "3," the AGV 100 does not perform the action at the address number 15, and further continues to travel along the travel guide line 1.

Then, when the AGV 100 reads the spot information of the address number 16, since the spot information is "16:S: 3" (see Table 1), the AGV 100 is at the station 3, and the note PC 9 writes "16" to the "AGV001" file stored in the server 31. Since the MAC address of "00:12:3E:6C:D8:ED" is set for the address number 16 in the AP switching table (FIG. 8C), the note PC 9 sets the access point (AP) of wireless LAN connection used for the note PC 9 as "00:12:3E:6C:D8:ED." Since the destination station number input to the note PC 9 is "3," the AGV 100 performs the action at the address number 16. Specifically, the AGV 100 stops at the station 3, and the display of the note PC 9 displays the station number input screen (steps S57, S58, S5).

At the station 3, for example, an operator unloads packages from the dolly or cart towed by the AGV 100 or loads packages on the dolly or cart towed by the AGV 100. Then, when the operator presses the start switch 10 without inputting the station number, the AGV 100 starts to travel again in the same direction along the travel guide line 1, which may be referred to as a return travel. When the start switch 10 is pressed without inputting the station number, the note PC 9 interprets that the instruction is the return travel to the start spot, which is also used as the goal spot.

When the AGV 100 reads the spot information of the address number 11 while the AGV 100 is travelling in the same direction along the travel guide line 1 for the return travel, since the spot information is "11:JI:80" (see Table 1), the AGV 100 is at a spot used as an entry to a junction number of "80," which is referred to as a junction-in, and the note PC 9 writes "11" to the "AGV001" file stored in the server 31. Since the MAC address of "00:12:3E:6C:D8:ED" is set for the address number 11 in the AP switching table (FIG. 8C), the note PC 9 sets the access point (AP) of wireless LAN connection used for the note PC 9 as "00:12:3E:6C:D8:ED."

Since the junction number is "80," the note PC 9 checks whether "/robot/J080" file exists in the server 31. If "/robot/J080" file does not exist in the server 31, "/robot/J080" file is generated (steps S51, S52, FIG. 7C). Then, by using the file lock/unlock system such as Unix (registered trademark), "/robot/J080 file" is locked. If the locking is succeeded (i.e., file can be used), the AGV 100 enters the junction number "80" (step S53). If the locking is failed (i.e., file cannot be used file) because another AGV 100 locks "/robot/J080," the AGV 100 stops at the address number 11, and is being stopped at the junction-in (steps S54, S12, S53) until the locking becomes succeeded.

If the locking is succeeded ((i.e., file can be used), and then the AGVC 100 enters the junction number "80," the AGVC 100 detects the address number 12, and reads the spot information of the address number 12. Since the spot information is "12:JO:80" (see Table 1), the AGV 100 is at a spot used as an exit of the junction number "80," which is referred to as the junction-out, and the note PC 9 writes "12" to the "AGV001" file stored in the server 31. Since the MAC address of "00:12:3E:6C:D8:ED" is set for the address number 12 in the AP switching table (FIG. 8C), the note PC 9 sets the access point (AP) of wireless LAN connection used for the note PC 9 as "00:12:3E:6C:D8:ED," and then "/robot/J080" file is unlocked since the junction number is "80" (steps S55, S56, FIG. 8C).

Then, when the AGVC 100 detects the address number 30, and reads the spot information of the address number 30. Since the spot information is "30:G," the AGV 100 is at the goal spot, which is also used as the start spot. Since the MAC address of "00:12:3E:6C:D8:98" is set for the address number 30 in the AP switching table (FIG. 8C), the note PC 9 sets the access point (AP) of wireless LAN connection used for the note PC 9 as "00:12:3E:6C:D8:98." Then, the AGVC 100 performs the action of the address number 30. Specifically, the AGV 100 stops at the address number 30 because the address number 30 is the goal spot, and the display of the note PC 9 displays the station number input screen (steps S59, S5).

In above described travel operation of the AGV 100 along the loop route of FIG. 4, the AGV 100 is controlled to stop at the station 3 having the address number 16, in which the AGV 100 starts to travel from the start spot (used also as the goal spot) and travels in the counter clockwise direction, and stops at the destination station 3 having the address number 16. When the user presses the start switch 10 without inputting the station number (i.e., return travel instruction) at the destination station 3 having the address number 16, the AGV 100 starts to travel again and returns to the start spot also used as the goal spot, and stops at the goal spot.

As to the above described automatic travel vehicle system or an operation system of an automatic travel vehicle, an adhesive tape can be used to set the travel guide line 1 on the travel surface as the travel operation schedule route, with which the travel operation schedule route can be set with lesser cost. Further, the travel operation schedule route can be changed easily by changing a route pattern of tape set on the travel surface, with which the travel operation schedule route can be changed easily and lesser cost. As to the above described the automatic travel vehicle system, when the AGV 100, which is an example of the automatic travel vehicle, detects the number set on the travel operation schedule route, the AGV 100 reads the action set for the number from the travel operation schedule table, and performs the corresponding action, with which the AGV 100 can be travelled based on the travel operation schedule table. Since the AGV 100 can be travelled based on the travel operation schedule table, for example, if the action set for all of address numbers in the travel operation schedule table is defined as "no action (–)," the AGV 100 can be travelled along the travel operation schedule route endlessly. As above described, by changing the contents of the travel operation schedule table, various travel operations can be performed by the AGV 100.

As to the above described the automatic travel vehicle system, one or new actions can be set in the travel operation schedule table, with which various actions can be performed by the AGV 100. For example, the action "U" indicating a U-turn can be added to enable the U-turn. Further, "S:1" indicating the station 1 can be modified to "S:1:10:30" by adding time information such as "10:30", with which the station start time can be designated and the AGV 100 can be controlled similar to the train operation management.

As to the above described automatic travel vehicle system, the identification code such as the address number detected by the AGV 100 from the travel surface can be written to "AGV001" file in the server 31, with which a position of the AGV 100 on the travel route can be identified. Further, information other than the address number (e.g., designated station number, status of being stopped, error is being detected, total time of station stop) can be written to "AGV001" file in the server 31, with which the status of AGV 100 can be identified further in detail. The travelling status of the AGV 100 can be displayed at the server 31. Further, a PC coupled to the server 31 can access the server 31 so that the travelling status of the AGV 100 can be acquired and displayed at the PC.

Figure 6D:
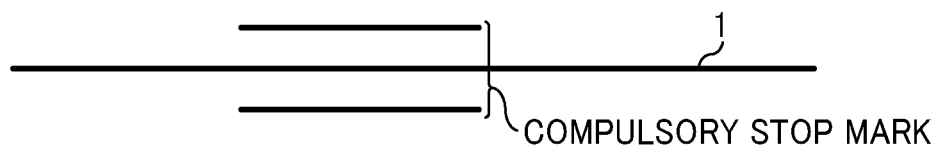
FIG. 6D is a plan view of an example of a mark indicating a compulsory stop.

Further, when a two-line mark having an address number is set for the travel guide line 1 as indicated in FIG. 6D such as one line at one side and another line at another side of the travel guide line 1, the two-line mark can be defined as "compulsory stop." The "compulsory stop" can be omitted from the travel operation schedule table, as required. As to the above described automatic travel vehicle system, the polarized lens is attached to the camera to filter or block a reflection light having higher brightness from the travel surface and the coded mark surface, but not limited hereto. For example, if a field of view of the camera is surrounded by a cover, the polarized lens can be omitted, and external ambient light can be blocked. As to the above described automatic travel vehicle system, black vinyl tape is pasted on the travel surface as the travel guide line 1, but not limited hereto. For example, the color of the tape can be changed as long as the image capture device 4 can capture the image of the tape by distinguishing the image of the tape from the travel surface. Further, the travel guide line 1 can be set by painting a line shape on the travel surface.

A description is given of a control of the posture of the body 2 when the AGV 100 is stopped. A description is given of a process of correcting the posture of the body 2 when the AGV 100 is stopped so that the posture of the body 2 can be set parallel to the travel guide line 1.

Figure 12A:
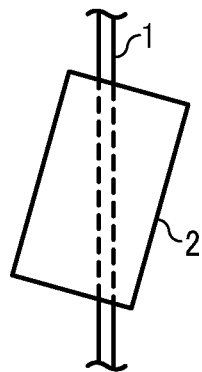
FIG. 12A illustrates an example case indicating a relationship of a posture of a body of the AGV and the travel guide line before controlling the posture of the body when the AGV is stopped.
Figure 12B:
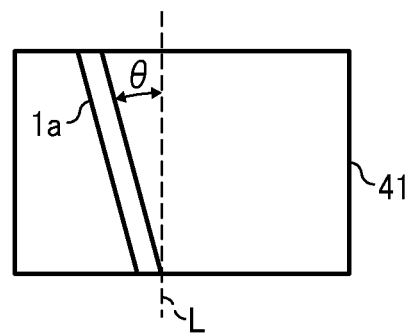
FIG. 12B illustrates a contour of the travel guide line in a captured image before controlling the posture of the body of the AGV when the AGV is stopped.
Figure 13A:
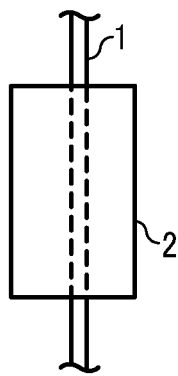
FIG. 13A illustrates an example case indicating a relationship of a posture of a body of the AGV and the travel guide line after controlling the posture of the body when the AGV is stopped.
Figure 13B:
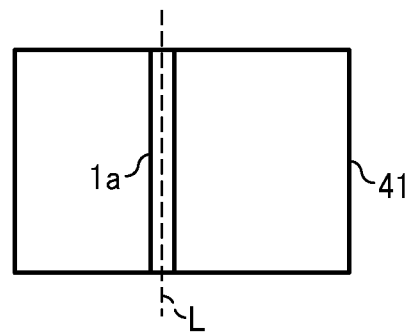
FIG. 13B illustrates a contour of the travel guide line in a captured image after controlling the posture of the body when the AGV is stopped.
Figure 14:
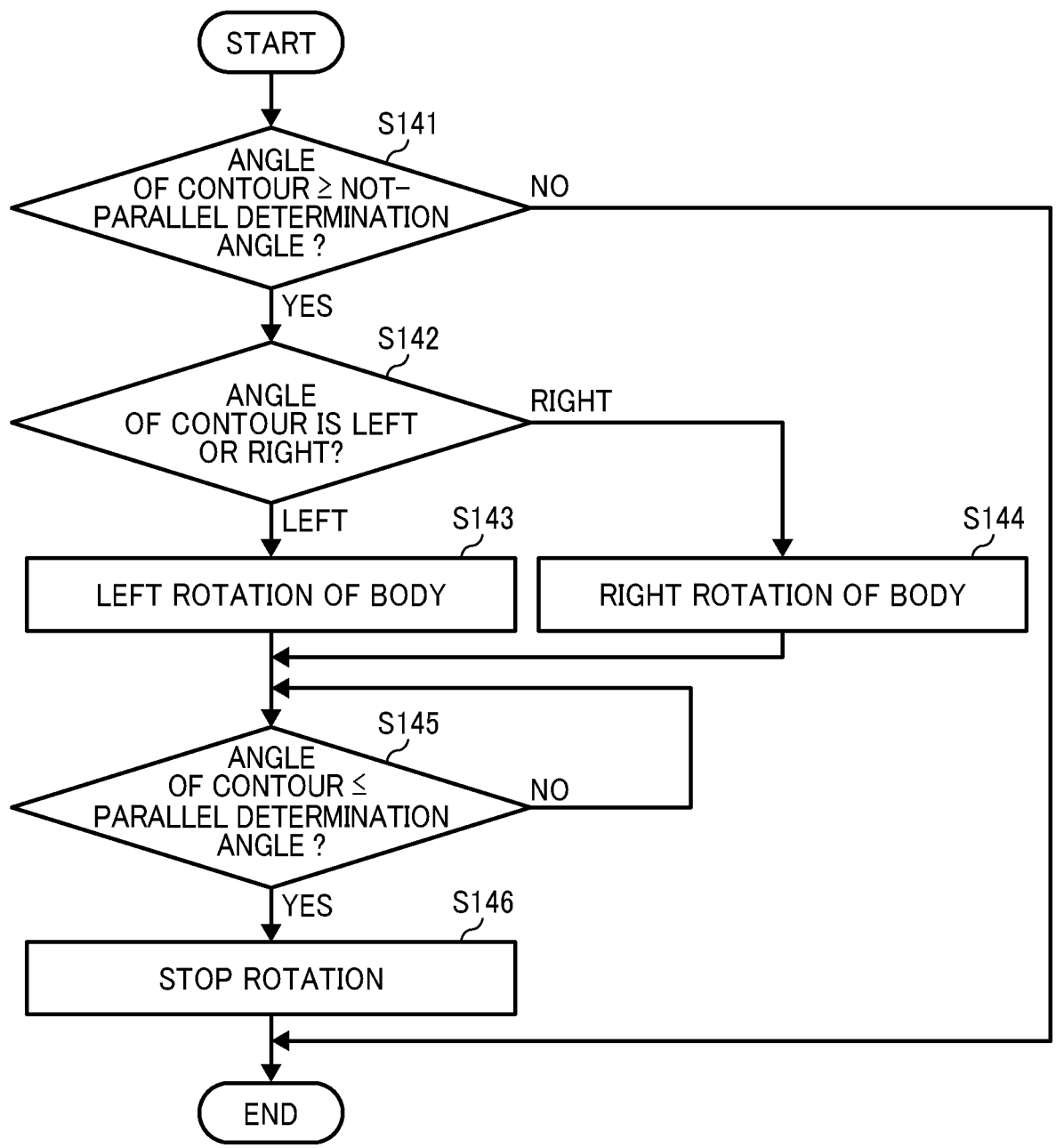
FIG. 14 is a flowchart illustrating steps of a process of controlling the posture of the body of the AGV when the AGV is stopped.

FIG. 12A illustrates an example case indicating a relationship of the posture of the body 2 and the travel guide line 1 before controlling the posture of the body 2 when the AGV 100 is stopped. FIG. 12B illustrates a contour 1a of the travel guide line 1 in the captured image 41 before controlling the posture of the body 2 when the AGV 100 is stopped. FIG. 13A illustrates an example case indicating a relationship of the posture of the body 2 and the travel guide line 1 after controlling the posture of the body 2 when the AGV 100 is stopped. FIG. 13B illustrates the contour 1a of the travel guide line 1 in the captured image 41 after controlling the posture of the body 2 when the AGV 100 is stopped. FIG. 14 is a flowchart illustrating steps of a process of controlling the posture of the body 2 when the AGV 100 is stopped.

In an example case indicated in FIGS. 12 to 14, an angle formed by the body 2 and the travel guide line 1 is used to determine whether the body 2 and the travel guide line 1 are parallel or not parallel. The angle to determine that the body 2 and the travel guide line 1 are not parallel is referred to a not-parallel determination angle. The angle to determine that the body 2 and the travel guide line 1 are parallel is referred to the parallel determination angle. For example, the not-parallel determination angle that determines that the body 2 and the travel guide line 1 are not parallel is set 10 degrees, and the parallel determination angle the body 2 that determines that the body 2 and the travel guide line 1 are parallel is set 3 degrees. Therefore, the rotation movement for correcting the posture of the body 2 is performed when the inclination of the body 2 with respect to the travel guide line 1 become 10 degrees or more, and the rotation movement for correcting the posture of the body 2 is stopped when the inclination of the body 2 with respect to the travel guide line 1 becomes 3 degrees or less.

As indicated in FIG. 14, at first, when the AGV 100 is stopped and the contour of the travel guide line 1 is extracted from the captured image 41, the angle θ of the contour 1a of the travel guide line 1 with respect to the reference line L set in the captured image 41 in the longitudinal direction of the captured image 41 is acquired. Then, the absolute value of the angle θ of the contour 1a and the not-parallel determination angle are compared (S141). The reference line L is parallel to the image capturing direction of the image 4 of the AGV 100.

If the absolute value of the angle of the contour 1a is equal to or greater than the not-parallel determination angle (S141: Yes), it is determined that the rotation movement for correcting the posture of the body 2 is required. By contrast, if the absolute value of the angle θ of the contour 1a becomes the not-parallel determination angle or less (S141: No), it is determined that the rotation movement for correcting the posture of the body 2 is not required.

In this example case of FIG. 12, the angle θ of the contour 1a with respect to the reference line L extending in the longitudinal direction of the captured image 40 is −15 degrees, which means the body 2 is inclined for 15 degrees to the right with respect to the travel guide line 1 as indicated in FIG. 12. Therefore, the absolute value of the angle θ of the contour 1a becomes 15 degrees, and becomes greater than the not-parallel determination angle (e.g., 10 degrees), with which it is determined that the rotation movement for correcting the posture of the body 2 is required.

If it is determined that the rotation movement for correcting the posture of the body 2 is required at step S141, the inclination of the travel guide line 1 is determined based on plus or minus sign of the angle θ of the contour 1a with respect to the travel guide line 1 in the captured image 40, in which it is determined whether the inclination of the travel guide line 1 is left or right (S142).

If the inclination of the travel guide line 1 is the left (i.e., the inclination of the body 2 is right), the left rotation movement is performed to the body 2 (S143). By contrast, if the inclination of the travel guide line 1 is the right (i.e., the inclination of the body 2 is left), the right rotation movement is performed to the body 2 (S144).

FIG. 12 indicates an example case that the angle θ of the contour 1a with respect to the travel guide line 1 in the captured image 40 has a minus value when the AGV 100 is stopped, and the body 2 is inclined to the right with respect to the travel guide line 1, and thereby the left rotation movement is performed to the body 2. Specifically, the electrical motor 25L connected to the left rear wheel 22L is rotated to the reverse direction, and the electrical motor 25R connected to the right rear wheel 22R is s rotated to the forward direction.

Then, while rotating the body 2, the angle θ of the contour 1a of the travel guide line 1 with respect to the reference line L extending in the longitudinal direction of the captured image 40 is acquired, and the absolute value of the angle θ of the contour 1a and the parallel determination angle are compared (S145). If the absolute value of the angle of the contour 1a is equal to or smaller than the parallel determination angle (S145: YES), the rotation movement for correcting the posture of the body 2 is stopped (S146). By contrast, if the absolute value of the angle θ of the contour 1a is greater than the parallel determination angle (S145: No), the rotation movement for correcting the posture of the body 2 is continued.

Since the parallel determination angle is set 3 degrees for this example case, when the angle θ of the contour 1a of the travel guide line 1 with respect to the reference line L extending in the longitudinal direction of the captured image 40 becomes 3 degrees or less, the left rotation movement of the body 2 is stopped. With employing this configuration, the body 2 can be set parallel to the travel guide line 1 as indicated in FIG. 13, and the angle precision becomes, for example, 3 degrees or less.

In the above described example case indicated in FIGS. 12 to 14, the posture of the body 2 is set parallel to the travel guide line 1 when the AGV 100 is stopped, but not limited hereto. For example, the posture of the body 2 can be inclined with respect to the travel guide line 1 by setting a target angle θt when the AGV 100 is stopped. For example, when the body 2 is inclined with respect to the travel guide line 1 to the right direction for the target angle θt, a line inclined to the left direction for the target angle θt with respect to the reference line L extending in the longitudinal direction of the captured image 40 is defined as a new reference line L1. Then, the body 2 is rotated so that the angle θ of the contour 1a of the travel guide line 1 with respect to the new reference line L1 becomes the parallel determination angle or less.

By contrast, when the body 2 is inclined with respect to the travel guide line 1 to the left direction for the target angle θt, a line inclined to the right direction for the target angle θt with respect to the reference line L extending in the longitudinal direction of the captured image 40 is defined as a new reference line L2. Then, the body 2 is rotated so that the angle θ of the contour 1a of the travel guide line 1 with respect to the new reference line L2 becomes the parallel determination angle or less.

As to the above described AGV 100, the image capture device 4 used for the above described travelling control such as detecting the mark is also used to capture an image of the travel guide line 1 to detect the inclination of the body 2 with respect to the travel guide line 1, but not limited hereto. For example, an image capture device to capture an image of the travel guide line 1 to detect the inclination of the body 2 with respect to the travel guide line 1, and an image capture device used for the above described travel control can be disposed as separate image capture devices. For example, the image capture device to capture the image of the travel guide line 1 to detect the inclination of the body 2 with respect to the travel guide line 1 can be disposed at the center of the bottom plate of the body 2, in which the image capture device may have a lighting device to irradiate the travel guide line 1.

A description is given of a case that the AGV 100 moves or travels along the travel guide line 1 in the opposite directions such as the AGV 100 shuttles or travels along the travel guide line 1 in a first travelling direction D1 and a second travelling direction D2 that are the opposite directions, in which the station number including a plurality of information is attached to the one adjacent portion of the travel guide line 1, and the station number is detected by the AGV 100.

Table 4 includes, for example, first travel-related information set for the first travelling direction D1, and second travel-related information set for the second travelling direction D2, which can be set for each row of the travel operation schedule table, and Table 4 indicates that data format of scheduled travel data is used as the travel-related information for one travel operation. As to an example of Table 4, the scheduled travel data includes the station number, and the travel-related information is associated with a plurality of address numbers set on the travel route (e.g., two address numbers in Table 4). Further, each of the travel-related information includes at least one data set. As to an example of Table 4, two travel-related information are set, and each of the travel-related information includes two data sets, and the two data sets are separated by a comma (,). The travel-related information can be stored in a memory such as the RAM 9b or other memories such as the RAM 31b of the server 31. The travel-related information includes, for example, stop instruction information to instruct the AGV 100 to stop at the spot attached with the mark having the travel-related information.

TABLE 4

| Station number | 1st travel-related information | 2nd travel-related information |
|---|---|---|
| | data set 1, data set 2 | data set 1, data set 2 |

Table 5 indicates an example of a format of data set included in Table 4. As to an example of Table 5, each data set includes, for example, an address identification code, an action identification sign, and a parameter corresponded to the action identification sign. The address identification code is a code information to identify the address number set on the travel route. The action identification sign is a sign information to identify an action to be performed by the AGV 100 at a specific address number. The parameter is information to designate contents of the specific action as required.

TABLE 5

| Address identification code | Action identification sign | Parameter |
|---|---|---|

Table 6 indicates an example of the action identification sign and the parameter of Table 5. For example, the action identification sign "S" means that the specific address number is detected as the station, and the AGV 100 is stopped at the specific address number, in which the parameter is not set. The action identification sign "B" is used as mark detection position information that designates a detection position of the mark 110 having the address number attached at the one adjacent portion of the travel guide line 1 in advance, and the parameter such as "L" or "R" is added. The parameter "L" designates that the mark detection is performed at the one adjacent portion of the travel guide line 1 that is the left side of the AGV 100, and the parameter "R" designates that the mark detection is performed at the one adjacent portion of the travel guide line 1 that is the right side of the AGV 100. Further, when the action identification sign is not set (i.e., parameter is not set), it means the AGV 100 passes through the specific address number without performing any action. As to the above described embodiments, a plurality of the mark detection position information can be managed by the server 31, in which the AGV 100 including the communication device 9d such as the wireless LAN device can receive the mark detection position information from the server 31. Since the mark detection position information can designate which one side of the AGV 100 is used to detect the mark, attached at the one adjacent portion of the travel guide line 1, the mark detection position can be changed and managed easily

TABLE 6

| Action identification sign | Parameter | Detail of Action |
|---|---|---|
| S | none | Recognize as station, and stop |
| B | L, R | L: detect mark at left side of body<br>R: detect mark at right side of body |
| — | none | Pass without action |

Figure 15:
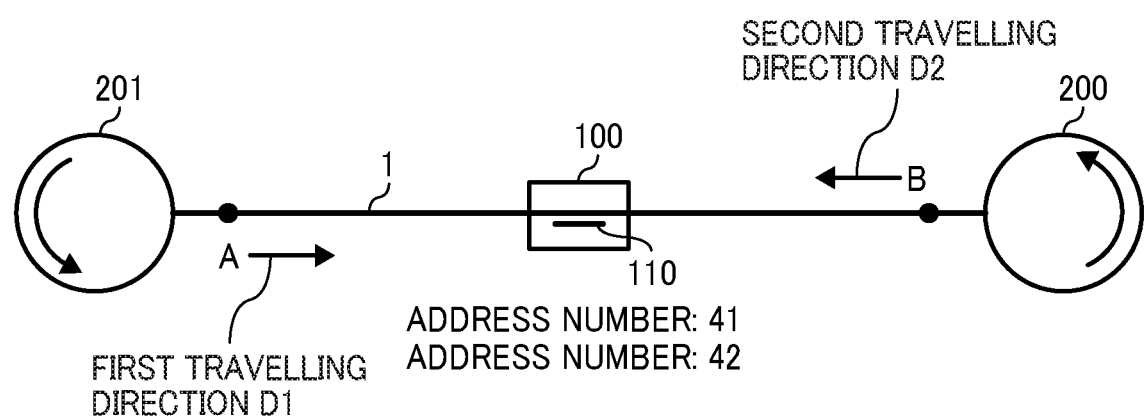
FIG. 15 is an example of a layout of a travel route when the AGV shuttles along a travel guide line.

FIG. 15 is an example of a layout of a travel route when the AGV 100 shuttles along the travel guide line 1 such as between one place and another place. Table 7 is an example of travel operation control data set for the travel operation schedule table used for the travel route of FIG. 15. As to an example case of FIG. 15, a user inputs the station number 10 as the destination station via the keyboard of the note PC 9 of the AGV 100, and the AGV 100 starts from a spot A set in the travel route of FIG. 15, in which the mark 110 having address numbers and having the length of 20 cm or more is attached at the one adjacent portion (i.e., one side) of the travel guide line 1 as an initial setting, and thereby a mark detection position condition (i.e., address number recognition condition) can be set by the mark 110.

TABLE 7

| 10 | 41: S, 41: B: R | 42: S, 42: B: L |
|---|---|---|

As to the travel route of FIG. 15, when the user presses the start switch 10, the AGV 100 starts to travel in the first travelling direction D1 along the travel guide line 1. When the destination station 10 is set with an address number 41, the row corresponded to the station number 10 set in the travel operation schedule table (see Table 7) is used as the travel operation control data. Then, when the AGV 100 reads data set for the address number of the station 10 in the travel route of FIG. 15, which is the first time address number after starting the travelling, the address number defined as the first data set in the travel operation schedule table (see Table 7) is selected, and the address number is recognized as the address number 41. Since the selection result is "41: S, 41:B:R" (see Table 7), the note PC 9 of the AGV 100 performs the action of "41: S" at first, which means that the note PC 9 of the AGV 100 interprets the spot having the address number 41 as the destination station 10 where the AGV 100 stops, and the note PC 9 of the AGV 100 controls the AGV 100 to stop at the destination station 10.

Since the execution instruction defined by the next data set is "41:B:R" as indicated in Table 7, the AGV 100 is instructed to detect the mark 110 having the address number 41 and having the length of 20 cm or more attached at the one adjacent portion of the travel guide line 1 in the first travelling direction D1, which is the first side of the AGV 100 such as the right side of the AGV 100 as indicated in FIG. 15. Therefore, when the note PC 9 of the AGV 100 recognizes or interprets the mark 110 having the address number 41 having the contour of 20 cm or more at the right side of the AGV 100 when the AGV 100 travels in the first travelling direction D1 of the travel guide line 1, the note PC 9 of the AGV 100 recognizes or interprets that the AGV 100 is at the address number 41 and reads the information set for the address number 41.

Then, when the user presses the start switch 10 again, the AGV 100 starts to travel again from the destination station 10 having the address number 41. Then, the AGV 100 makes a turn at a U-turn course 200, which is at the right end in the travel route of FIG. 15 in the counter clockwise direction, and then the AGV 100 travels along the same travel route in the second travelling direction D2, which is the opposite direction of the first travelling direction D1. Since the mark detection position condition (i.e., address number recognition condition) is changed to the detection of the mark having the contour of 20 cm or more at the second side of the AGV 10 such as the left side of the AGV 10, the note PC 9 of the AGV 10 can recognize an address number 42 set at the same spot that is the destination station 10 having the previously read address number (i.e., address number 41). When the address number 42 is read, the address number 42 defined in the travel operation schedule table (see Table 7) is selected, and the address number 42 is recognized as the address number. Since the selection result is "42:S, 42:B:L" (see Table 7), the note PC 9 of the AGV 100 performs the action set for "42:S" at first, which means that the note PC 9 of the AGV 100 interprets the spot having the address number 42 as the destination station 10 where the AGV 100 stops, and the note PC 9 of the AGV 100 controls the AGV 100 to stop at the destination station 10.

Since the next execution instruction of the address number 42 in Table 7 is "42:B:L," the AGV 100 is instructed to detect the mark 110 having the address number 42 having the length of 20 cm or more attached at the one adjacent portion of the travel guide line 1, which is the left side of the AGV 100 when the AGV 100 travels in the second travelling direction D2 of the travel guide line 1 as indicated in the travel route of FIG. 15. Therefore, when the note PC 9 of the AGV 100 recognizes or interprets the mark 110 having the address number 42 having the contour of 20 cm or more at the left side of the AGV 100 when the AGV 100 travels in the second travelling direction D2 of the travel guide line 1, the note PC 9 of the AGV 100 recognizes or interprets that the AGV 100 is at the address number 42 and reads the information set for the address number 42.

As above described, one mark having a plurality of address numbers can be set for each one of spots set along the travel guide line 1. As above described in FIG. 15, the mark 110 having the address numbers 41 and 42 can be set for one spot set along the travel guide line 1, in which the AGV 100 can be stopped at the same spot when the AGV 100 travels along the travel guide line 1 in the first travelling direction D1 and the second travelling direction D2 based on the address numbers 41 and 42 when the AGV 100 shuttles along the travel guide line 1.

A description is given of a case that the AGV 100 starts to travel from the spot A in the travel route of FIG. 15, and different instructions are set at the same one spot attached with the mark 110 having the different address numbers. Table 8 is another example of the travel operation control data of the travel operation schedule table used for the travel route of FIG. 15, in which the mark 110 having the address numbers and having the length of 20 cm or more is attached at the one adjacent portion of the travel guide line 1, which is the first side of the AGV 100 when the AGV 100 travels in the first travelling direction D1 along the travel guide line 1, and the AGV 100 starts to travel from the spot A in the first travelling direction D1 for a first-time travel operation, and then the mark 110 is detected by the AGV 100.

TABLE 8

| 20 | 41: S | 42: — |
|---|---|---|

When the AGV 100 reads data set for the address number in the row set with the station number 20 in Table 8, which is the first time address number after starting the travelling from the spot A in the travel route of FIG. 15, the first address number defined in the travel operation schedule table (see Table 8) is selected, and the address number is recognized as the address number 41. Since the selection result is "41: S" (see Table 8), the note PC 9 of the AGV 100 performs the action set for "41: S," which means that the note PC 9 of the AGV 100 interprets the spot having the address number 41 as the destination station 20 where the AGV 100 stops, and the note PC 9 of the AGV 100 controls the AGV 100 to stop at the destination station 20.

Since the data set read for the first time does not include data of the action identification sign "B," the mark 110 having the address number 41 and having the length of 20 cm or more attached at the one adjacent portion of the travel guide line 1 is detected at the first side of the AGV 100 when the AGV 100 travels in the first travelling direction D1 of the travel guide line 1. Then, the AGV 100 makes a turn at the U-turn course 200, which is at the right end in the travel route of FIG. 15 in the counter clockwise direction, and then the AGV 100 travels along the same travel route in the second travelling direction D2 from the spot B to the spot A in the travel route of FIG. 15.

After the AGV 100 passes the spot B and the AGV 100 travels along the same travel route in the second travelling direction D2, the AGV 100 reaches the destination station 20, and then the AGV 100 detects the mark 110 having the address number 42. When the AGV 100 reads the address number 42 from the mark 110, the next data set is read from the travel operation schedule table (see Table 8). Since the selection result is "42:-" (see Table 8), the AGV 100 perform the action set for "42:-," in which the note PC 9 interprets that the address number 42 is not set with any action, and thereby the note PC 9 of the AGV 100 controls the AGV 100 to continue the travelling without stopping. Then, the AGV 100 makes a turn at the U-turn course 201, which is at the left end in the travel route of FIG. 15 in the counter clockwise direction, and then the AGV 100 travels along the same travel route in the first travelling direction D1 again, which is a second-time travel operation of the AGV 100. Then, the AGV 100 detects the mark 110 having the address number 41 again, and stops at the address number 41.

As above described, the AGV 100 can be stopped at the spot when the AGV 100 travels in the first travelling direction D1 along the travel guide line 1, and the AGV 100 can continue to travel without stopping at the same spot when the AGV 100 travels in the second travelling direction D2 along the travel guide line 1 of FIG. 15, in which the AGV 100 can be stopped at the same spot for one time per one round travel operation of the AGV 100 along the travel guide line 1. The one time stop per one round travel operation of the AGV 100 can be instructed by defining different instructions to the address numbers set in the travel operation schedule table, and attaching the mark 110 having the different address numbers at one side of the travel guide line 1.

As to the above described embodiments, the AGV 100 can travel in the first travelling direction D1 along the travel guide line 1 and in the second travelling direction D2 along the travel guide line 1, in which the first travelling direction D1 and the second travelling direction D2 are the opposite directions along the travel guide line 1. When the AGV 100 travels in the first travelling direction D1 along the travel guide line 1, the AGV 100 detects a mark at one side of the AGV 100, and when the AGV 100 travels in the second travelling direction D2 along the travel guide line 1, the AGV 100 detects the same mark at an opposite side of the AGV 100. For example, when the AGV 100 travels in the first travelling direction D1 along the travel guide line 1, the AGV 100 detects a mark attached to one side (i.e., one adjacent portion) of the travel guide line 1 at one stop, in which the AGV 100 detects mark at the right side of the AGV 100, and when the AGV 100 travels in the second travelling direction D2 along the travel guide line 1, the AGV 100 detects the same mark attached to the travel guide line 1 at the same one stop at the left side (i.e., opposite side)

of the AGV 100. Therefore, the one adjacent portion used for setting the mark is disposed at one side of the travel guide line 1 at one stop, which means the mark is disposed at the one side of the travel guide line 1 alone.

Conventionally, one mark is attached at the first adjacent portion of the travel guide line such as the right side of the travel guide line so that the mark is detectable by the automatic travel vehicle when the automatic travel vehicle travels in the first travelling direction along the travel guide line. Further, another mark is attached at the second adjacent portion of the travel guide line such as the left side of the travel guide line so that the another mark is detectable by the automatic travel vehicle when the automatic travel vehicle travels in the second travelling direction along the same travel guide line, in which the first adjacent portion and the second adjacent portion are the opposite sides of travel guide line. Therefore, two marks are attached of the travel guide line for each one of spots (i.e., one mark for the first adjacent portion and another one mark for the second adjacent portion), which is at the right side and left side of the travel guide line, with which the work load of attaching the marks along the travel guide line increases because the two marks are attached along the travel guide line for each one of the spots set along the travel guide line.

Compared to the conventional system, the mark is attached at one adjacent portion of the travel guide line 1 alone for the above described embodiments, with which the number of marks attached along the travel guide line can be reduced, and thereby the workload for attaching the marks for each one of the spots set on the travel surface can be reduced.

As to the above described embodiments, the automatic travel vehicle is configured to travel in the opposite directions along the travel guide line attached with the mark at the adjacent portion along the travel guide, in which the number of marks attached along the travel guide line can be reduced, and thereby the workload for attaching the marks for each one of the spots set on the travel surface can be reduced.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier medium such as compact disc-read only memory (CD-ROM), digital versatile disc-read only memory (DVD-ROM) or the like for distribution, or can be stored on a storage on a network and downloaded as required.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present disclosure may be practiced otherwise than as specifically described herein. For example, elements and/or features of different examples and illustrative embodiments may be combined each other and/or substituted for each other within the scope of this disclosure and appended claims.

What is claimed is:

1. An automatic travel vehicle comprising:
    a body;
    a motor to move the body on a travel surface along a travel guide line on the travel surface;
    an image capture device to detect a mark at a first side of the travel guide line, by recognizing the mark at the first side of the travel guide line upon the automatic travel vehicle traveling in a first direction, and to detect the mark at the first side of the travel guide line upon the automatic travel vehicle travelling in a second direction, the mark being a single mark detectable by the image capture device at the first side of the travel guide line upon the automatic travel vehicle traveling in the first direction and detectable by the image capture device at the first side of the travel guide line upon the automatic travel vehicle traveling in the second direction, the first direction and the second direction being in opposite directions; and
    at least one processor configured to control, based on the mark detected by the image capture device, the automatic travel vehicle, wherein the control of the automatic travel vehicle based on the mark detected is different in the first direction than the control of the automatic travel vehicle based on the mark detected in the second direction, and
    configured to interpret the mark, detected by the image capture device, as being at a first side of the body upon the automatic travel vehicle travelling along the travel guide line in a first travelling direction, and being configured to interpret the mark, detected by the image capture device, as being at a second side of the body upon the automatic travel vehicle travelling along the travel guide line in a second travelling direction, the first side of the body being opposite the second side of the body.

2. The automatic travel vehicle of claim 1, wherein the image capture device is configured to capture an image of the mark and to capture an image of the travel guide line on the travel surface, and wherein the automatic travel vehicle is configured to travel along the travel guide line based on the image of the travel guide line captured by the image capture device.

3. The automatic travel vehicle of claim 1, further comprising:
    a memory to store travel-related information associated with the mark,
    the travel-related information including mark detection position information to designate a mark detection side for the automatic travel vehicle, the mark detection side indicating which one of the first side of the body and the second side of the body is to be used to detect the mark,
    the mark detection position information designating the first side of the body as the mark detection side upon the automatic travel vehicle travelling along the travel guide line in the first travelling direction, and designating the second side of the body as the mark detection side upon the automatic travel vehicle travelling along the travel guide line in the second travelling direction, and
    wherein the at least one processor is configured to interpret the mark based on the mark detection position information.

4. The automatic travel vehicle of claim 3, wherein the memory is configured to store the mark detection position information set for the mark, and wherein the mark is attached for each spot set along the travel guide line.

5. The automatic travel vehicle of claim 3, wherein the travel-related information includes stop instruction information to instruct the automatic travel vehicle to stop at a spot attached with the mark associated with the travel-related information.

6. The automatic travel vehicle of claim 3, further comprising a receiver to receive the mark detection position information from a server.

7. The automatic travel vehicle of claim 2, further comprising:
- a memory to store travel-related information associated with the mark,
- the travel-related information including mark detection position information to designate a mark detection side for the automatic travel vehicle, the mark detection side indicating which one of the first side of the body and the second side of the body is to be used to detect the mark,
- the mark detection position information designating the first side of the body as the mark detection side upon the automatic travel vehicle travelling along the travel guide line in the first travelling direction, and designating the second side of the body as the mark detection side upon the automatic travel vehicle travelling along the travel guide line in the second travelling direction, and
- wherein the at least one processor is configured to interpret the mark based on the mark detection position information.

8. The automatic travel vehicle of claim 7, wherein the memory is configured to store the mark detection position information set for the mark, and wherein the mark is attached for each spot set along the travel guide line.

9. The automatic travel vehicle of claim 7, wherein the travel-related information includes stop instruction information to instruct the automatic travel vehicle to stop at a spot attached with the mark associated with the travel-related information.

10. The automatic travel vehicle of claim 7, further comprising a receiver to receive the mark detection position information from a server.

* * * * *